US011646829B2

(12) United States Patent
Tseng

(10) Patent No.: US 11,646,829 B2
(45) Date of Patent: May 9, 2023

(54) METHOD AND APPARATUS FOR HANDLING DISCONTINUOUS RECEPTION (DRX) TIMER FOR DATA RECEPTION OF UNICAST AND MULTICAST IN A WIRELESS COMMUNICATION SYSTEM

(71) Applicant: ASUSTek Computer Inc., Taipei (TW)

(72) Inventor: Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/903,077

(22) Filed: Sep. 6, 2022

(65) Prior Publication Data
US 2023/0097118 A1 Mar. 30, 2023

Related U.S. Application Data

(60) Provisional application No. 63/243,854, filed on Sep. 14, 2021.

(51) Int. Cl.
*H04L 1/1607* (2023.01)
*H04L 1/1812* (2023.01)
(Continued)

(52) U.S. Cl.
CPC .............. *H04L 1/1812* (2013.01); *H04L 1/08* (2013.01); *H04L 1/1678* (2013.01); *H04W 24/08* (2013.01); *H04W 72/23* (2023.01)

(58) Field of Classification Search
CPC ....... H04L 1/1812; H04L 1/08; H04L 1/1678; H04W 24/08; H04W 72/042
See application file for complete search history.

(56) References Cited

U.S. PATENT DOCUMENTS

2018/0110085 A1* 4/2018 Tseng .................... H04W 72/14
2022/0038214 A1* 2/2022 Shrestha ................ H04L 1/1864
(Continued)

FOREIGN PATENT DOCUMENTS

KR 20080086315 A 9/2008

OTHER PUBLICATIONS

Corresponding European Patent Application No. 22194077.8, Extended European Search Report Jan. 12, 2023 dated Jan. 12, 2023, 9 pages.
(Continued)

*Primary Examiner* — Chi Ho A Lee
(74) *Attorney, Agent, or Firm* — Cooper Legal Group LLC

(57) ABSTRACT

In an example, a User Equipment (UE) receives and/or detects a transmission of data from a network. The transmission of the data is addressed to a Group Radio Network Temporary Identifier (G-RNTI) for a Hybrid Automatic Repeat Request (HARQ) process. In response to receiving and/or detecting the transmission of the data, the UE (i) starts a first HARQ Round Trip Time (RTT) timer associated with the G-RNTI for the HARQ process, and (ii) starts a second HARQ RTT timer associated with a Cell Radio Network Temporary Identifier (C-RNTI) for the HARQ process. The UE starts a multicast retransmission timer for the HARQ process in response to expiry of the first HARQ RTT timer. The UE starts a unicast retransmission timer for the HARQ process in response to expiry of the second HARQ RTT timer. The UE receives and/or detects a first retransmission of the DL data addressed to the G-RNTI for the HARQ process. In response to receiving and/or detecting the first retransmission of the data, the UE (i) stops the multicast retransmission timer, and (ii) stops the unicast retransmission timer.

20 Claims, 13 Drawing Sheets

(51) Int. Cl.
  *H04W 24/08*  (2009.01)
  *H04L 1/08*   (2006.01)
  *H04W 72/23*  (2023.01)

(56) References Cited

U.S. PATENT DOCUMENTS

| | | | |
|---|---|---|---|
| 2022/0046677 A1* | 2/2022 | Talarico | H04L 1/08 |
| 2022/0116152 A1* | 4/2022 | Iyer | H04L 1/188 |
| 2022/0124781 A1* | 4/2022 | Meylan | H04W 72/1289 |
| 2022/0131656 A1* | 4/2022 | Lee | H04L 1/1854 |
| 2022/0132277 A1* | 4/2022 | Shrivastava | H04W 76/40 |
| 2022/0183049 A1* | 6/2022 | Lee | H04W 74/006 |
| 2022/0225410 A1* | 7/2022 | Turtinen | H04W 74/0866 |
| 2022/0232661 A1* | 7/2022 | Chin | H04W 24/08 |

OTHER PUBLICATIONS

Qualcomm Inc.: "NR Multicast DRX Aspects", 3GPP TSG-RAN WG2 Meeting #115e, R2-2107545, E-Meeting: Aug. 16-27, 2021, 6 pages.

Intel Corporation: "MBS MAC Layer and Group Scheduling Aspects", 3GPP TSG-RAN WG2 Meeting #114-e, R2-2104876, Electronic Meeting, May 19-27, 2021, 10 pages.

* cited by examiner

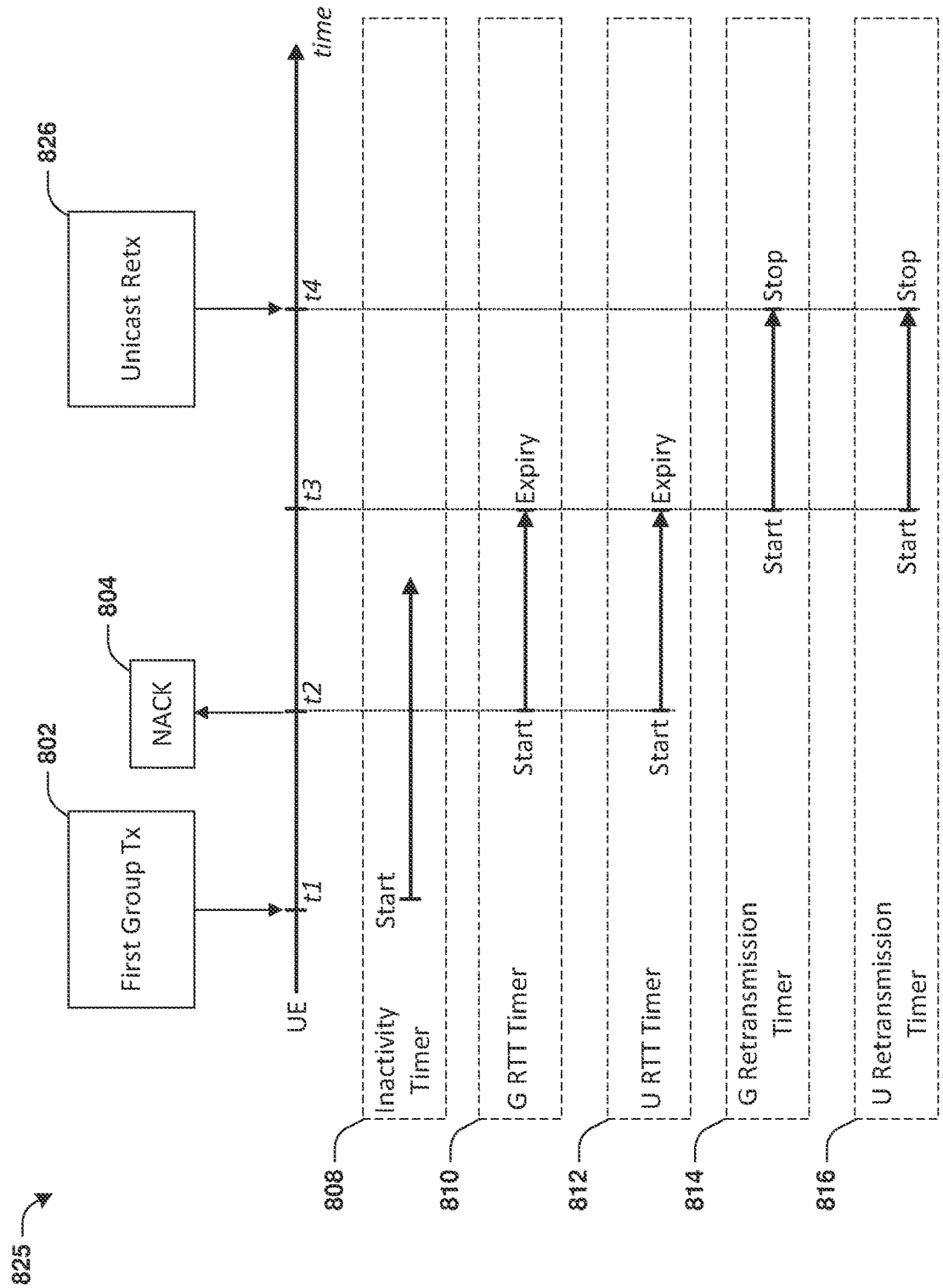

METHOD AND APPARATUS FOR HANDLING DISCONTINUOUS RECEPTION (DRX) TIMER FOR DATA RECEPTION OF UNICAST AND MULTICAST IN A WIRELESS COMMUNICATION SYSTEM

CROSS-REFERENCE TO RELATED APPLICATIONS

The present Application claims the benefit of U.S. Provisional Patent Application Ser. No. 63/243,854 filed on Sep. 14, 2021, the entire disclosure of which is incorporated herein in its entirety by reference.

FIELD

This disclosure generally relates to wireless communication networks, and more particularly, to a method and apparatus for handling Discontinuous Reception (DRX) timer for data reception of unicast and multicast in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives and/or detects a transmission of data from a network, wherein the transmission of the data is addressed to a Group Radio Network Temporary Identifier (G-RNTI) for a Hybrid Automatic Repeat Request (HARQ) process. In response to receiving and/or detecting the transmission of the data, the UE (i) starts a first HARQ Round Trip Time (RTT) timer associated with the G-RNTI for the HARQ process, and (ii) starts a second HARQ RTT timer associated with a Cell Radio Network Temporary Identifier (C-RNTI) for the HARQ process. The UE starts a multicast retransmission timer for the HARQ process in response to expiry of the first HARQ RTT timer. The UE starts a unicast retransmission timer for the HARQ process in response to expiry of the second HARQ RTT timer. The UE receives and/or detects a first retransmission of the DL data addressed to the G-RNTI for the HARQ process. In response to receiving and/or detecting the first retransmission of the data, the UE (i) stops the multicast retransmission timer, and (ii) stops the unicast retransmission timer.

In an example from the perspective of a UE, the UE receives and/or detects a transmission of data, associated with a HARQ process, from a network. In response to receiving and/or detecting the transmission of the data, the UE (i) starts a first HARQ RTT timer associated with a G-RNTI for the HARQ process if the transmission of the data is addressed to the G-RNTI, and/or (ii) starts a second HARQ RTT timer associated with a C-RNTI for the HARQ process if the transmission of the data is addressed to the G-RNTI or the C-RNTI. The UE starts a multicast retransmission timer for the HARQ process in response to expiry of the first HARQ RTT timer. The UE starts a unicast retransmission timer for the HARQ process in response to expiry of the second HARQ RTT timer. The UE receives and/or detects a first retransmission of the DL data addressed to the G-RNTI or the C-RNTI for the HARQ process. In response to receiving and/or detecting the first retransmission of the data, the UE (i) stops the multicast retransmission timer, and (ii) stops the unicast retransmission timer.

In an example from the perspective of a User Equipment (UE), the UE receives and/or detects a transmission of data from a network, wherein the transmission of the data is addressed to a G-RNTI for a HARQ process. In response to receiving and/or detecting the transmission of the data, the UE (i) starts a first HARQ RTT timer associated with the G-RNTI for the HARQ process, and (ii) starts a second HARQ RTT timer associated with a C-RNTI for the HARQ process. The UE starts a multicast retransmission timer for the HARQ process in response to expiry of the first HARQ RTT timer. The UE starts a unicast retransmission timer for the HARQ process in response to expiry of the second HARQ RTT timer. The UE receives and/or detects a first retransmission of the DL data addressed to the C-RNTI for the HARQ process. In response to receiving and/or detecting the first retransmission of the data, the UE (i) stops the multicast retransmission timer, and (ii) stops the unicast retransmission timer.

BRIEF DESCRIPTION OF THE DRAWINGS

FIG. 8B is a diagram illustrating an exemplary scenario associated with handling retransmission timers and/or HARQ RTT timers according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.331 V16.0.0 (2020-03), "3GPP TSG RAN, Radio Resource Control (RRC) protocol specification (Release 16)"; 3GPP TS 36.321 V16.0.0 (2020-03), "3GPP TSG RAN, Medium Access Control (MAC) protocol specification (Release 16)"; 3GPP TS 38.321 V16.3.0 (2020-12), "3GPP TSG RAN, Medium Access Control (MAC) protocol specification (Release 16)"; R2-2106554 38.300 Running CR for MBS in NR; R2-2106483 [Pre114-e][002][MBS] Summary on MBS scheduling; R2-2104876 MBS MAC layer and group scheduling aspects, Intel Corporation; R2-2104993 Considerations on Multiplexing & Scheduling Aspects, Samsung; R2-2105654 Open issues group scheduling, Ericsson; R2-2106283 RAN2 aspects of group scheduling, Huawei, CBN, HiSilicon; R2-2108846 Summary of MBS Scheduling and Power Saving; RP-212266 Status Report to TSG (MBS). The standards and documents listed above are hereby expressly incorporated by reference in their entirety.

Figure 1:
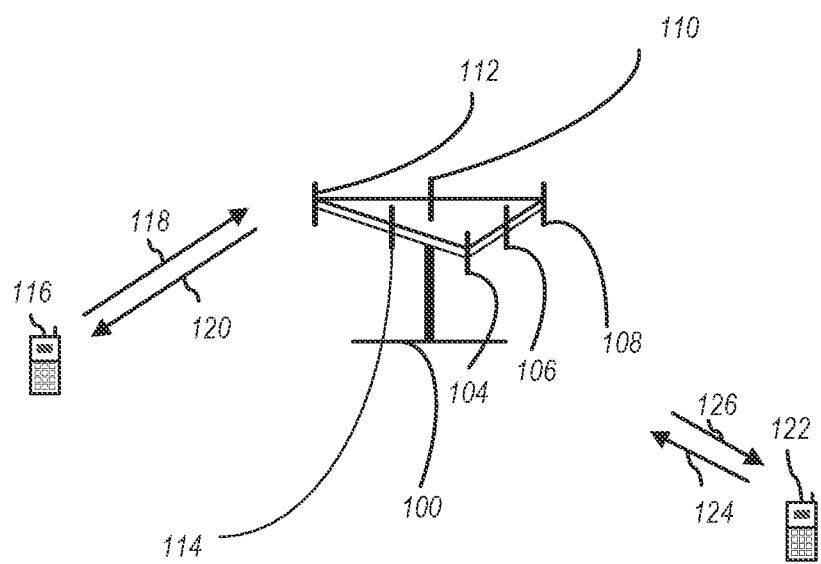
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
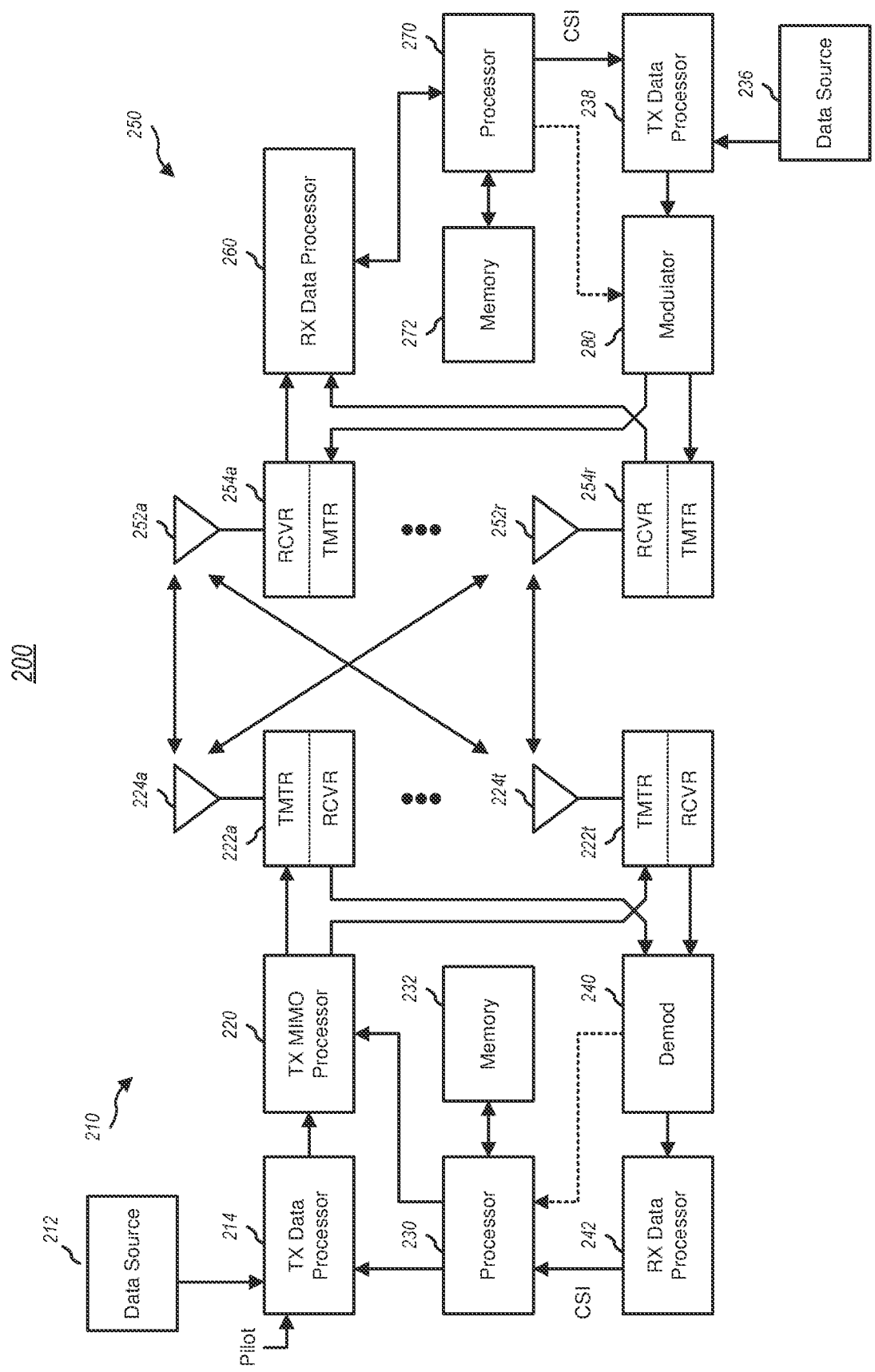
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
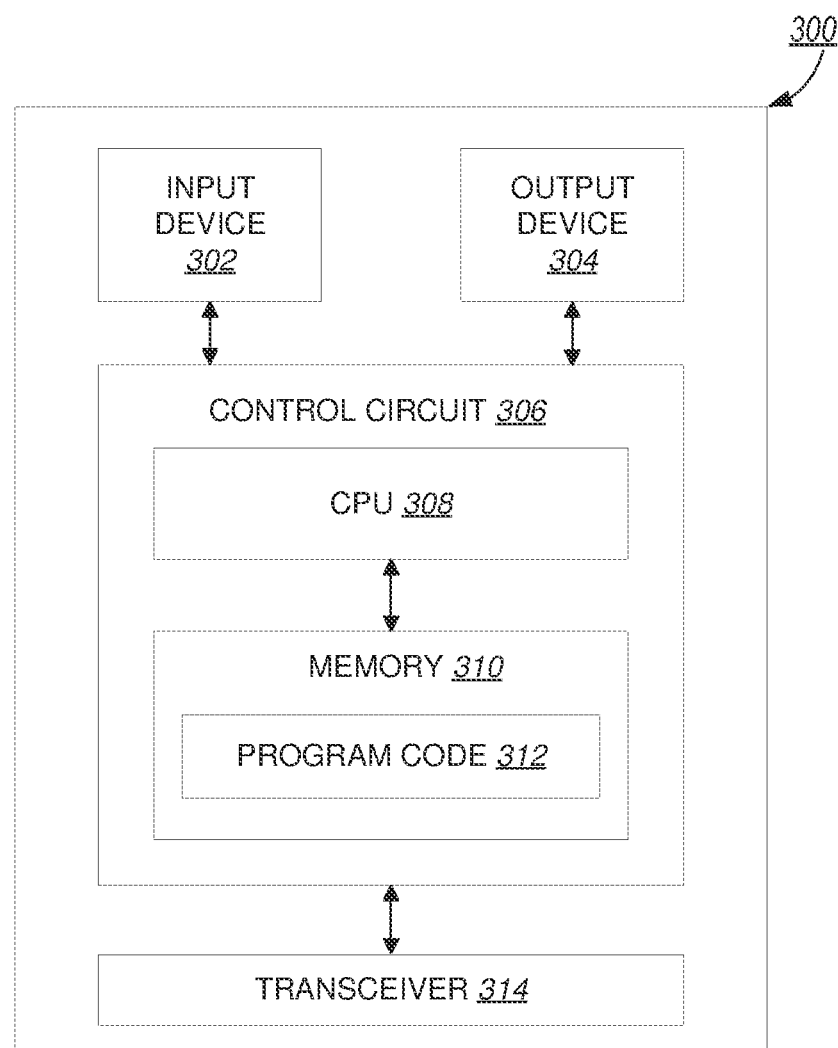
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
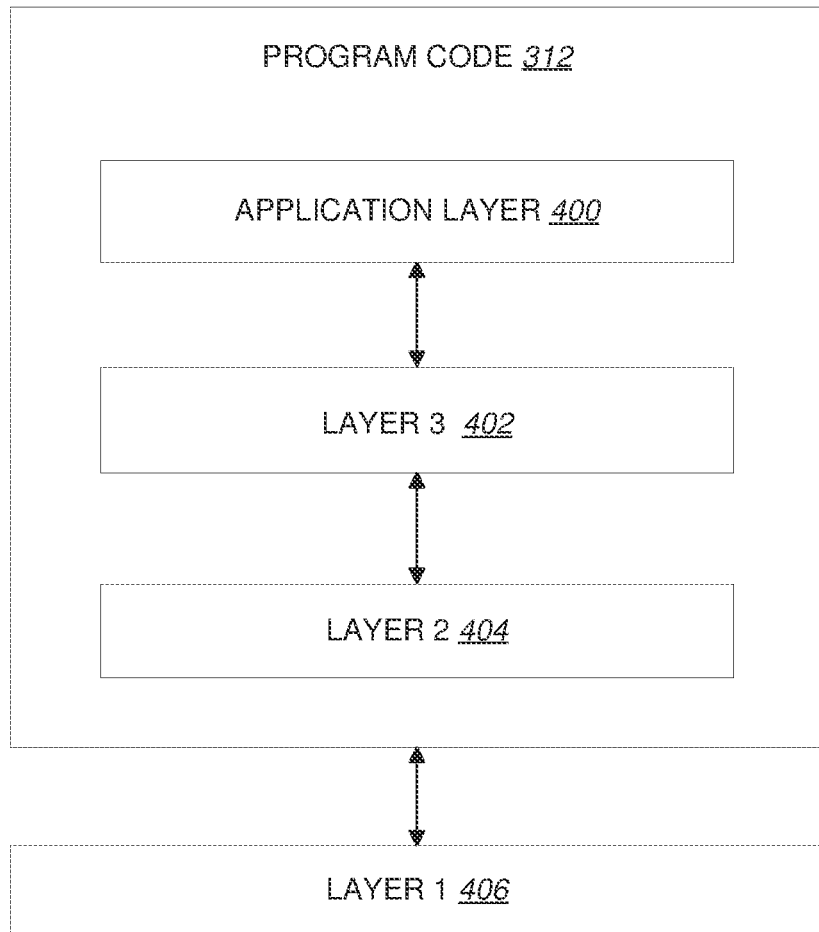
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more parts of 3GPP TS 36.331 V16.0.0 (2020-03) are quoted below:

6.3.7a SC-PTM Information Elements
SC-MTCH-InfoList

The IE SC-MTCH-InfoList provides the list of ongoing MBMS sessions transmitted via SC-MRB and for each MBMS session, the associated G-RNTI and scheduling information.

| SC-MTCH-InfoList information element |
|---|
| ```
-- ASN1START
SC-MTCH-InfoList-r13 ::=            SEQUENCE (SIZE (0..maxSC-MTCH-r13)) OF
SC-MTCH-Info-r13
SC-MTCH-Info-r13 ::=                SEQUENCE {
    mbmsSessionInfo-r13                 MBMSSessionInfo-r13,
    g-RNTI-r13                          BIT STRING(SIZE(16)),
    sc-mtch-schedulingInfo-r13          SC-MTCH-SchedulingInfo-r13
    OPTIONAL,   -- Need OP
    sc-mtch-neighbourCell-r13           BIT STRING (SIZE(maxNeighCell-
SCPTM-r13)) OPTIONAL,   -- Need OP
    ...,
    [[ p-a-r13                          ENUMERATED {
                                            dB-6, dB-4dot77, dB-3, dB-1dot77,
                                            dB0, dB1, dB2, dB3}      OPTIONAL --
Need ON
    ]]
}
MBMSSessionInfo-r13 ::=             SEQUENCE {
    tmgi-r13                            TMGI-r9,
    sessionId-r13                       OCTET STRING (SIZE (1))    OPTIONAL -
- Need OR
}
``` |

-continued

| SC-MTCH-InfoList information element |
|---|

```
SC-MTCH-SchedulingInfo-r13::=       SEQUENCE {
    onDurationTimerSCPTM-r13            ENUMERATED {
                                            psf1, psf2, psf3, psf4, psf5, psf6,
                                            psf8, psf10, psf20, psf30, psf40,
                                            psf50, psf60, psf80, psf100,
                                            psf200},
    drx-InactivityTimerSCPTM-r13        ENUMERATED {
                                            psf0, psf1, psf2, psf4, psf8,
                                            psf10, psf20, psf40,
                                            psf80, psf160, ps320,
                                            psf640, psf960,
                                            psf1280, psf1920, psf2560},
    schedulingPeriodStartOffsetSCPTM-r13 CHOICE {
        sf10                                INTEGER(0..9),
        sf20                                INTEGER(0..19),
        sf32                                INTEGER(0..31),
        sf40                                INTEGER(0..39),
        sf64                                INTEGER(0..63),
        sf80                                INTEGER(0..79),
        sf128                               INTEGER(0..127),
        sf160                               INTEGER(0..159),
        sf256                               INTEGER(0..255),
        sf320                               INTEGER(0..319),
        sf512                               INTEGER(0..511),
        sf640                               INTEGER(0..639),
        sf1024                                  INTEGER(0..1023),
        sf2048                                  INTEGER(0..2048),
        sf4096                                  INTEGER(0..4096),
        sf8192                                  INTEGER(0..8192)
    },
    ...
}
-- ASN1STOP
```

| SC-MTCH-InfoList field descriptions |
|---|
| drx-InactivityTimerSCPTM |
| Timer for SC-MTCH in TS 36.321 [6]. Value in number of PDCCH sub-frames. Value psf0 corresponds to 0 PDCCH sub-frame and behaviour as specified in 7.3.2 applies, psf1 corresponds to 1 PDCCH sub-frame, psf2 corresponds to 2 PDCCH sub-frames and so on. |
| g-RNTI |
| G-RNTI used to scramble the scheduling and transmission of a SC-MTCH. |
| mbmsSessionInfo |
| Indicates the ongoing MBMS session in a SC-MTCH. |
| onDurationTimerSCPTM |
| Timer for SC-MTCH reception in TS 36.321 [6]. Value in number of PDCCH sub-frames. Value psf1 corresponds to 1 PDCCH sub-frame, psf2 corresponds to 2 PDCCH sub-frames and so on. |
| p-a |
| Parameter: $P_A$", for the SC-MTCH per G-RNTI, see TS 36.213 [23], clause 5.2. Value dB-6 corresponds to −6 dB, dB-4dot77 corresponds to −4.77 dB etc. |
| schedulingPeriodStartOffsetSCPTM |
| SCPTM-SchedulingCycle and SCPTM-SchedulingOffset in TS 36.321 [6]. The value of SCPTM-SchedulingCycle is in number of sub-frames. Value sf10 corresponds to 10 sub-frames, sf20 corresponds to 20 sub-frames and so on. The value of SCPTM-SchedulingOffset is in number of sub-frames. The E-UTRAN does not configure a maximum value 2048 for sf2048, 4096 for sf4096 or 8192 for sf8192. |
| sc-mtch-neighbourCell |
| Indicates neighbour cells which also provide this service on SC-MTCH. The first bit is set to 1 if the service is provided on SC-MTCH in the first cell in scptmNeighbourCellList, otherwise it is set to 0. The second bit is set to 1 if the service is provided on SC-MTCH in the second cell in scptmNeighbourCellList, and so on. If this field is absent, the UE shall assume that this service is not available on SC-MTCH in any neighbour cell. |
| sc-mtch-schedulingInfo |
| DRX information for the SC-MTCH. If this field is absent, the SC-MTCH may be scheduled in any subframe. |

One or more parts of 3GPP TS 36.321 V16.0.0 (2020-03) are quoted below.

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), UL Semi-Persistent Scheduling V-RNTI (if configured), eIMTA-RNTI (if configured), SL-RNTI (if configured), SL-V-RNTI (if configured), CC-RNTI (if configured), SRS-TPC-RNTI (if configured), and AUL C-RNTI (if configured). When in RRC_CONNECTED, if DRX is configured, the MAC entity is allowed to monitor the PDCCH discontinuously using the DRX operation specified in this clause; otherwise the MAC entity monitors the PDCCH continuously. When using DRX operation, the MAC entity shall also monitor PDCCH according to requirements found in other clauses of this specification. RRC controls DRX operation by configuring the timers onDurationTimer, drx-InactivityTimer, drx-Retransmission Timer (for HARQ processes scheduled using 1ms TTI, one per DL HARQ process except for the broadcast process), drx-RetransmissionTimerShorttTI (for HARQ processes scheduled using short TTI, one per DL HARQ process), drx-ULRetransmission Timer (for HARQ processes scheduled using 1ms TTI, one per asynchronous UL HARQ process), drx-ULRetransmissionTimerShorttTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see clause 7.7).

When a DRX cycle is configured, the Active Time includes the time while:

[ . . . ]

5.7a Discontinuous Reception (DRX) for SC-PTM

Each G-RNTI and, for NB-IoT UEs, BL UEs or UEs in enhanced coverage, each SC-RNTI of the MAC entity may be configured by RRC with a DRX functionality that controls the UE's PDCCH monitoring activity for this G-RNTI and SC-RNTI as specified in TS 36.331 [8]. When in RRC_IDLE or RRC_CONNECTED, if DRX is configured, the MAC entity is allowed to monitor the PDCCH for this G-RNTI or SC-RNTI discontinuously using the DRX operation specified in this clause; otherwise the MAC entity monitors the PDCCH for this G-RNTI or SC-RNTI continuously. For each G-RNTI or SC-RNTI of the MAC entity, RRC controls its DRX operation by configuring the timers onDurationTimerSCPTM, drx-InactivityTimerSCPTM, the SCPTM-SchedulingCycle and the value of the SCPTM-SchedulingOffset for G-RNTI and for SC-RNTI. The DRX operation specified in this clause is performed independently for each G-RNTI and SC-RNTI and independently from the DRX operation specified in subcaluse 5.7.

When DRX is configured for a G-RNTI or for SC-RNTI, the Active Time includes the time while:

onDurationTimerSCPTM or drx-InactivityTimerSCPTM is running.

When DRX is configured for a G-RNTI or for SC-RNTI as specified in TS 36.331 [8], the MAC entity shall for each subframe for this G-RNTI or SC-RNTI:

if [(H-SFN*10240+SFN*10)+subframe number] modulo (SCPTM-SchedulingCycle)=SCPTM-SchedulingOffset:
  start onDurationTimerSCPTM.
during the Active Time, for a PDCCH-subframe:
  monitor the PDCCH;
  if the PDCCH indicates a DL transmission:
    if the UE is a BL UE or a UE in enhanced coverage:
      start or re-start the drx-InactivityTimerSCPTM in the subframe containing the last repetition of the corresponding PDSCH reception.
    if the UE is an NB-IoT UE:
      stop onDurationTimerSCPTM;
      stop drx-InactivityTimerSCPTM;
      start the drx-InactivityTimerSCPTM in the first subframe of the next PDCCH occasion following the subframe containing the last repetition of the corresponding PDSCH reception.
    else:
      start or restart drx-InactivityTimerSCPTM.
  NOTE: If H-SFN is not configured its value is set to 0 in the calculation of the starting subframe.

One or more parts of 3GPP TS 38.321 V16.3.0 (2020-12) are quoted below:

3.1 Definitions

For the purposes of the present document, the terms and definitions given in TR 21.905 [1] and the following apply. A term defined in the present document takes precedence over the definition of the same term, if any, in TR 21.905 [1].

[ . . . ]

DRX group: A group of Serving Cells that is configured by RRC and that have the same DRX Active Time.

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: If Sidelink resource allocation mode 1 is configured by RRC, a DRX functionality is not configured.

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

When a DRX cycle is configured, the Active Time for Serving Cells in a DRX group includes the time while:

drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer (as described in clause 5.1.5) or msgB-Response Window (as described in clause 5.1.4a) is running; or a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
2> start the drx-HARQ-RTT-TimerDL for the corresponding HARQ process in the first symbol after the end of the corresponding transmission carrying the DL HARQ feedback;
2> stop the drx-RetransmissionTimerDL for the corresponding HARQ process.

1> if a MAC PDU is transmitted in a configured uplink grant and LBT failure indication is not received from lower layers:
2> start the drx-HARQ-RTT-TimerUL for the corresponding HARQ process in the first symbol after the end of the first transmission (within a bundle) of the corresponding PUSCH transmission;
2> stop the drx-RetransmissionTimerUL for the corresponding HARQ process at the first transmission (within a bundle) of the corresponding PUSCH transmission.

1> if a drx-HARQ-RTT-TimerDL expires:
2> if the data of the corresponding HARQ process was not successfully decoded:
3> start the drx-RetransmissionTimerDL for the corresponding HARQ process in the first symbol after the expiry of drx-HARQ-RTT-TimerDL.

1> if a drx-HARQ-RTT-TimerUL expires:
2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:
2> stop drx-onDurationTimer for each DRX group;
2> stop drx-InactivityTimer for each DRX group.

1> if drx-InactivityTimer for a DRX group expires:
2> if the Short DRX cycle is configured:
3> start or restart drx-ShortCycleTimer for this DRX group in the first symbol after the expiry of drx-InactivityTimer;
3> use the Short DRX cycle for this DRX group.
2> else:
3> use the Long DRX cycle for this DRX group.

1> if a DRX Command MAC CE is received:
2> if the Short DRX cycle is configured:
3> start or restart drx-ShortCycleTimer for each DRX group in the first symbol after the end of DRX Command MAC CE reception;
3> use the Short DRX cycle for each DRX group.
2> else:
3> use the Long DRX cycle for each DRX group.

1> if drx-ShortCycleTimer for a DRX group expires:
2> use the Long DRX cycle for this DRX group.

1> if a Long DRX Command MAC CE is received:
2> stop drx-ShortCycleTimer for each DRX group;
2> use the Long DRX cycle for each DRX group.

1> if the Short DRX cycle is used for a DRX group, and [(SFN×10)+subframe number] modulo (drx-ShortCycle)=(drx-StartOffset) modulo (drx-ShortCycle):
2> start drx-onDurationTimer for this DRX group after drx-SlotOffset from the beginning of the subframe.

1> if the Long DRX cycle is used for a DRX group, and [(SFN×10)+subframe number] modulo (drx-LongCycle)=drx-StartOffset:
2> if DCP monitoring is configured for the active DL BWP as specified in TS 38.213 [6], clause 10.3:
3> if DCP indication associated with the current DRX cycle received from lower layer indicated to start drx-onDurationTimer, as specified in TS 38.213 [6]; or
3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-Response-Window is running (as specified in clause 5.1.4); or
  3> if ps-Wakeup is configured with value true and DCP indication associated with the current DRX cycle has not been received from lower layers:
    4> start drx-onDurationTimer after drx-SlotOffset from the beginning of the subframe.
2> else:
  3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;

NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.

3> stop the drx-RetransmissionTimerDL for the corresponding HARQ process.
    3> if the PDSCH-to-HARQ_feedback timing indicate a non-numerical k1 value as specified in TS 38.213 [6]:
      4> start the drx-RetransmissionTimerDL in the first symbol after the PDSCH transmission for the corresponding HARQ process.
  2> if the PDCCH indicates a UL transmission:
    3> start the drx-HARQ-RTT-TimerUL for the corresponding HARQ process in the first symbol after the end of the first transmission (within a bundle) of the corresponding PUSCH transmission;
    3> stop the drx-RetransmissionTimerUL for the corresponding HARQ process.
  2> if the PDCCH indicates a new transmission (DL or UL) on a Serving Cell in this DRX group:
    3> start or restart drx-InactivityTimer for this DRX group in the first symbol after the end of the PDCCH reception.
  2> if a HARQ process receives downlink feedback information and acknowledgement is indicated:
    3> stop the drx-RetransmissionTimerUL for the corresponding HARQ process.

1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
  2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
    3> not transmit periodic SRS and semi-persistent SRS defined in TS 38.214 [7];
    3> not report semi-persistent CSI configured on PUSCH;
    3> if ps-TransmitPeriodicL1-RSRP is not configured with value true:
      4> not report periodic CSI that is L1-RSRP on PUCCH.
    3> if ps-TransmitOtherPeriodicCSI is not configured with value true:
      4> not report periodic CSI that is not L1-RSRP on PUCCH.
1> else:
  2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
    3> not transmit periodic SRS and semi-persistent SRS defined in TS 38.214 [7] in this DRX group;
    3> not report CSI on PUCCH and semi-persistent CSI configured on PUSCH in this DRX group.
  2> if CSI masking (csi-Mask) is setup by upper layers:
    3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
      4> not report CSI on PUCCH in this DRX group.

NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.

The MAC entity needs not to monitor the PDCCH if it is not a complete PDCCH occasion (e.g. the Active Time starts or ends in the middle of a PDCCH occasion).

Figure 5:
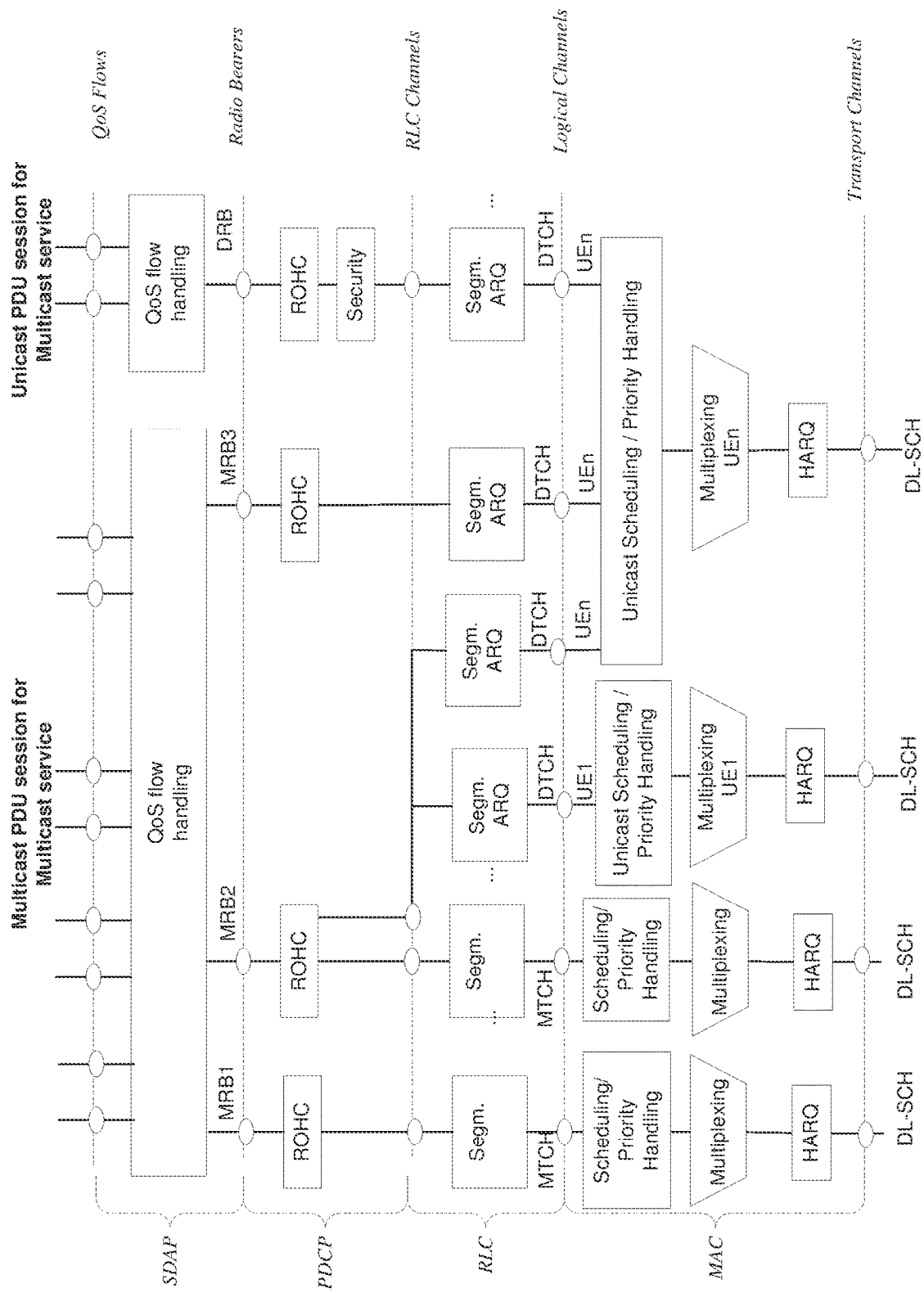
FIG. 5 is a diagram illustrating an exemplary scenario associated with a downlink layer architecture for a multicast session according to one exemplary embodiment.
Figure 6:
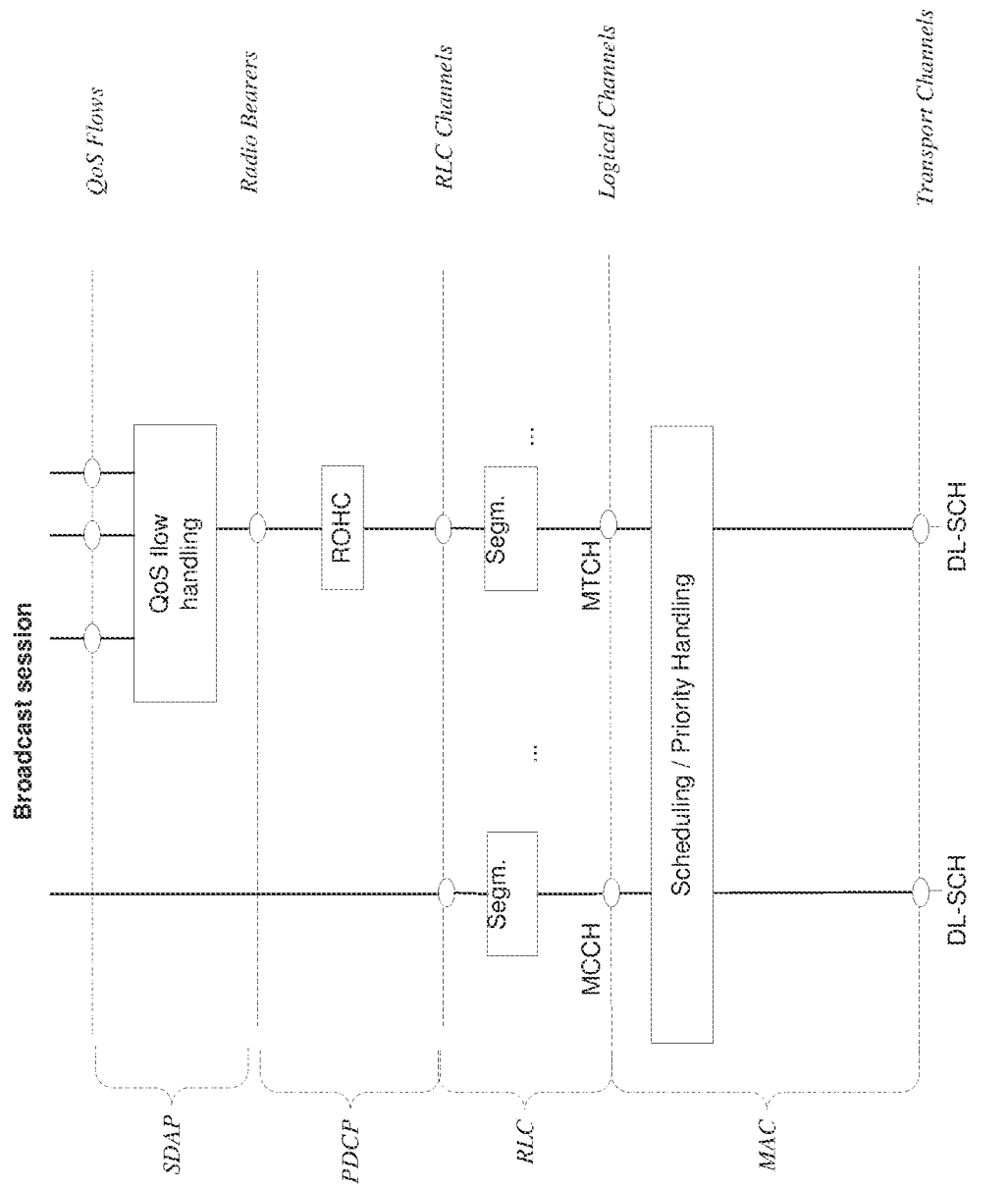
FIG. 6 is a diagram illustrating an exemplary scenario associated with a downlink layer architecture for a broadcast session according to one exemplary embodiment.

One or more parts of R2-2106554 are quoted below. Notably, Figure 16.x.3-1 of Section 16.x.3 of R2-2106554, entitled "Downlink Layer 2 Architecture for Multicast Session", is reproduced herein as FIG. 5. Figure 16.x.3-2 of Section 16.x.3 of R2-2106554, entitled "Downlink Layer 2 Architecture for Broadcast Session", is reproduced herein as FIG. 6.

3.1 Abbreviations

For the purposes of the present document, the abbreviations given in TR 21.905 [1], in TS 36.300 [2] and the following apply. An abbreviation defined in the present document takes precedence over the definition of the same abbreviation, if any, in TR 21.905 [1] and TS 36.300 [2].

BCCH Broadcast Control Channel
G-RNTI Group RNTI
G-CS-RNTI Group Configured Scheduling RNTI
MBS Multicast/Broadcast Services
MCCH MBS Control Channel
MRB MBS Radio Bearer MT Mobile Termination
MTCH MBS Traffic Channel
MU-MIMO Multi User MIMO
PTM Point-to-Multipoint
PTP Point-to-Point
PUCCH Physical Uplink Control Channel
PUSCH Physical Uplink Shared Channel 16.x Multicast and Broadcast Services 16.x.1 General Editor's Note: General aspects to be covered here.

NR system enables resource efficient delivery of multicast/broadcast services (MBS).

For broadcast communication service, the same service and the same specific content data are provided simultaneously to all UEs in a geographical area (i.e., all UEs in the MBS service area are authorized to receive the data). A broadcast communication service is delivered to the UEs using a broadcast session. A UE can receive a broadcast communication service in RRC_IDLE, RRC_INACTIVE and RRC_CONNECTED state.

For multicast communication service, the same service and the same specific content data are provided simultaneously to a dedicated set of UEs (i.e., not all UEs in the MBS service area are authorized to receive the data). A multicast communication service is delivered to the UEs using a multicast session. A UE can receive a multicast communication service in RRC_CONNECTED state with mechanisms such as PTP and/or PTM delivery, as defined in section 16.x.5.4. HARQ feedback/retransmission can be applied to both PTP and PTM transmission.

Editor's Note: FFS is the term "MB S service area", if the term is kept in the normative definitions defined in the SA2 TS 23.xxx.

Editor's Note: These definitions come from TR 23.757, but should eventually be replaced with normative definitions defined in the SA2 TS 23.xxx.

16.x.2 Network Architecture

Editor's Note: RAN3 to provide architecture aspects here.

16.x.3 Protocol Architecture

Editor's Note: User plane and control plane protocol architecture to be covered here.

Figure 16.x.3-1and 16.x.3-2 depict the Downlink Layer 2 architecture for multicast session and broadcast session respectively, where MBS protocol stack comprises the same layer 2 sublayers as described in section 6 with the following differences:

SDAP sublayer provides only the following functionalities:
  Mapping between a MBS QoS flow and a MRB;
  Transfer of user plane data.
PDCP sublayer provides only the following functionalities:
  Transfer of data;
  Maintenance of PDCP SNs;
  Header compression and decompression using the ROHC protocol;
  Reordering and in-order delivery;
  Duplicate discarding.

For multicast session, gNB provides the following one or more MRB configuration(s) to the UE:
  MRB with one RLC-UM or RLC-AM entity for PTP transmission;
  MRB with one RLC-UM entity for PTM transmission;
  MRB with two RLC-UM entities, one RLC-UM entity for PTP transmission and the other RLC-UM entity for PTM transmission as described in section 16.x.5.4;
  MRB with two RLC-UM entities, one RLC-AM entity for PTP transmission and the other RLC-UM entity for PTM transmission as described in section 16.x.5.4;

Editor's Note: Whether to support security in PDCP requires progress and input from other WG, i.e. SA3.

Figure 16.x.3-1: Downlink Layer 2 Architecture for Multicast Session

For broadcast session, gNB provides the following one or more MRB configuration(s) to the UE:
  MRB with one RLC-UM entity for PTM transmission;

Figure 16.x.3-2: Downlink Layer 2 Architecture for Broadcast Session 16.x.4 Group Scheduling Editor's Note: Group scheduling related aspects to be covered here.

The following logical channels are used in MBS delivey:
  MTCH: A point-to-multipoint downlink channel for transmitting MBS data of either multicast session or broadcast session from the network to the UE;
  DTCH: A point-to-point channel defined in section 6.2.2 for transmitting traffic data of multicast;
  MCCH: A point-to-multipoint downlink channel used for transmitting MBS control information for broadcast session from the network to the UE, for one or several MTCH(s);

The following connections between logical channels and transport channels for group transmission exist:
  MCCH can be mapped to DL-SCH;
  MTCH can be mapped to DL-SCH;

The following decipts the usage of RNTI for group transmission:
  There is a one-to-one mapping between MBS Session and G-RNTI used for the reception of the DL-SCH to which a MTCH is mapped;
  There is a one-to-one mapping between MBS Session and G-CS-RNTI used for the reception of the DL-SCH to which a MTCH is mapped;
  A UE can receive different services using different G-RNTIs/G-CS-RNTIs;
  Different logical channels associated with the same G-RNTI may be multiplexed together;
  Different logical channels associated with the same C-RNTI may be multiplexed together.

Editor's Note: FFS if there is a need to have specific LCID spaces for the MTCH/MCCH and whether the LCID space for MTCH and DTCH is shared or separate.

Editor's Note: FFS if Multiplexing/de-multiplexing of different logical channels associated with the same G-CS-RNTI is supported for NR MBS.

Editor's Note: FFS whether for PTM transmission of NR MBS, DRX scheme is independent of DRX for unicast transmission, e.g. supported on a per G-RNTI basis Editor's Note: FFS whether for PTP transmission, DRX operation for unicast transmission is reused.

Editor's Note: FFS whether multiple G-RNTIs/G-CS-RNTIs are supported depends on UE capability.

Editor's Note: FFS other mappings between MBS session and G-RNTI.

16.x.5 Multicast Handling 16.x.5.1 Session Management

Editor's Note: RAN3 to provide Session management aspects here.

16.x.5.2 Configuration

Editor's Note: FFS how multicast configuration is provided for supporting multicast reception in RRC_CONNECTED state.

If the UE which joined the multicast session is in RRC_CONNECTED state, the gNB sends RRC Reconfiguration message with relevant MBS configuration for multicast session to the UE and there is no need for separate session activation notification for this UE.

MBS supporting gNBs notify the UEs in RRC_IDLE/INACTIVE state about a multicast session activation using a group notification mechanism. The group notification is addressed with P-RNTI on PDCCH, and the paging channels are monitored by the UE as described in section 9.2.5. And each UE is not paged individually, and the same group notification identity, i.e., MBS session ID, is used for UEs with the same multicast session in both RRC_IDLE and RRC INACTIVE states.

gNBs not supporting MBS may notify the UEs in RRC_IDLE/INACTIVE state about a multicast session activation through Paging messages in the PO as described in section 9.2.5, where each UE is paged individually.

[ . . . ]

16.x.5.4 PTP/PTM Dynamic Switch

Editor's Note: Dynamic switch related aspects to be covered here.

For multicast service, gNB may deliver MBS data packets using the following methods:

PTP Transmission: gNB individually delivers separate copies of MBS data packets to each UEs independently, i.e. gNB uses UE-specific PDCCH with CRC scrambled by UE-specific RNTI (e.g., C-RNTI) to schedule UE-specific PDSCH which is scrambled with the same UE-specific RNTI.

PTM Transmission: gNB delivers a single copy of MBS data packets to a set of UEs, e.g., gNB uses group-common PDCCH with CRC scrambled by group-common RNTI to schedule group-common PDSCH which is scrambled with the same group-common RNTI.

Editor's Note: FFS that RAN1 inputs are needed for the definition of PTP/PTM transmission.

If a UE is configured with a split MRB, a gNB dynamically decides whether to deliver multicast data by PTM or PTP for a given UE based on the protocol stack defined in section 16.x.3.

For a split MRB, the usage of the PTP leg cannot be deactivated, i.e. the UE needs to always monitor C-RNTI and the state of RLC entity for PTP delivery is always active, after the necessary split MRB configuration.

Editor's Note: When two RLC entities are configured for a MRB for PTP delivery and PTM delivery respectively by RRC, it is FFS whether the state of RLC entity for PTM delivery can be active or deactive and can be dynamically controlled.

[ . . . ]

RAN2 #112-e agreements

Broadcast and Multicast Sessions Support, RRC States and Other Aspects Related to SA2 LS For Rel-17, R2 specifies two modes:

1: One delivery mode for high QoS (reliability, latency) requirement, to be available in CONNECTED (possibly the UE can switch to other states when there is no data reception TBD)

2: One delivery mode for "low" QoS requirement, where the UE can also receive data in INACTIVE/IDLE (details TBD).

R2 assumes (for R17) that delivery mode 1 is used only for multicast sessions.

R2 assumes that delivery mode 2 is used for broadcast sessions.

The applicability of delivery mode 2 to multicast sessions is FFS.

No data: When there is no data ongoing for the multicast session, the UE can stay in RRC_CONNECTED. Other cases FFS It is up to SA2 to decide whether the multicast session activation/deactivation mechanism is supported or not, and RAN2 will discuss if there is any RAN2 impacts based on SA2 inputs.

It is up to SA2 to decide on the support of local MBS service, and RAN2 will discuss the RAN2 impacts based on SA2 inputs.

In general, Information of MBS services/groups subscribed by the UE (e.g. TMGI) and QOS requirements of a MBS service should be provided to RAN. Detail information e.g. for PTM PTP switch if any is FFS.

Idle and Inactive Mode Ues

Both idle/inactive UEs and connected mode UEs can receive MBS services transmitted by NR MBS delivery mode 2 (Broadcast service as already agreed, TBD other). The ability for connected mode UEs to receive this may depend on the network provisioning of the service (e.g. which freq), UE connected mode configuration and UE capabilities.

The two-step based approach (i.e. BCCH and MCCH) as adopted by LTE SC-PTM is reused for the transmission of PTM configuration for NR MBS delivery mode 2.

Assume it is possible to reuse LTE SC-PTM mechanism for the CONNECTED UEs to receive the PTM configuration for NR MBS delivery mode 2, i.e. broadcast based manner.

Assume that MCCH change notification mechanism is used to notify the changes of MCCH configuration due to session start for delivery mode 2 of NR MBS (other cases FFS, if any).

Assume that MBS Interest Indication is supported for UEs in connected mode for Broadcast service (assume that as usual there is no mandatory network requirement, network action is up to network).

MBS Interest Indication is NOT supported for UEs in idle/inactive mode for NR MBS delivery mode 2.

Assume that some information for purpose of service continuity can be provided for NR MBS delivery mode 2. (FFS what—need to be revisited, e.g. based on progress in other groups, e.g. USD, SAI/TMGI etc)

FFS whether support UE awareness of MBS services on frequency basis for service continuity for NR MBS delivery mode 2 (i.e. Reuse LTE SC-PTM mechanism).

FFS Support frequency prioritization during cell reselection for service continuity for NR MBS delivery mode 2 (i.e. Reuse LTE SC-PTM mechanism).

P2: Whether UEs that receive Multicast can be released to RRC Inactive/Idle and continue receiving Multicast is Postponed. Should limit to RRC inactive in future discussions Group Scheduling and Others One-to-one mapping between G-RNTI and MBS session is supported in NR MBS. Other mappings FFS One-to-one mapping between G-CS-RNTI and MBS session is supported in NR MBS. Other mappings FFS.

A UE can support multiple G-RNTIs/G-CS-RNTIs, It is FFS whether this depends on UE capability. Inform RAN1 of this agreement.

Multiple MBS QoS flows corresponding to the same MBS session can be mapped to one or more than one MBS radio bearers.

MCCH is mapped to the DL-SCH for NR MBS delivery mode 2.

MTCH is specified for PTM transmission of NR MBS.

MTCH is mapped to the DL-SCH.

DTCH is reused for PTP transmission of NR MBS.

FFS if there is a need to have specific LCID spaces for the used channels.

Multiplexing/de-multiplexing of different logical channels associated with the same G-RNTI is supported for NR MBS.

FFS if Multiplexing/de-multiplexing of different logical channels associated with the same G-CS-RNTI is supported for NR MBS.

Multiplexing/de-multiplexing of different logical channels associated with the C-RNTI is supported for NR MBS.

For NR MBS delivery mode 2, LTE SC-PTM DRX scheme is used as baseline.

FFS whether For PTM transmission of NR MBS, DRX scheme is independent of DRX for unicast transmission, e.g. supported on a per G-RNTI basis FFS whether For PTP transmission, DRX operation for unicast transmission is reused.

One or more parts of R2-2106483 are quoted below:

2.1 L2 Modeling for MBS Group Scheduling 2.1.1 Mapping Between G-RNTI/G-CS-RNTI and MBS Session In LTE SC-PTM, there is a one-to-one mapping between MBMS session, which is identified by the TMGI, and MBMS traffic logical channel (e.g. SC-MTCH). Further, the transmissions of an SC-MTCH are associated with a G-RNTI. Hence, there is a one-to-one mapping between TMGI and G-RNTI.

For NR MBS, considering that each MBS session can support one or multiple QoS flows according to the SA2 agreement, it is worthy to reconsider the mapping relation between G-RNTI and MBS session. Further, as agreed in RAN1 #104bis-e meeting, G-CS-RNTI was defined for both the activation/deactivation of SPS group-common PDSCH and PTM scheme 1 based dynamic retransmission. Then, it seems a spontaneous logic that the mapping relation between G-CS-RNTI and MBS session needs to be also considered.

Contributions [1][2][7][8][9][11][13][15][17][18][19][20] [21] proposed that there could be one-to-one mapping between G-RNTI and MBS session, the same as LTE SC-PTM. The intention is to avoid UE from receiving/processing MBS services in which the UE is not interested. With this, both UE complexity and power consumption on blind PDCCH detection can be largely reduced.

Furthermore, contributions [2][15][18][21][22] proposed that the mapping between G-RNTI and MBS session can be extended to one-to-multiple mapping (based on network configuration and UE capability). The main reason supporting this mapping relation is that the mandate LTE one-to-one mapping rule makes it difficult for the network to efficiently satisfy the service requirements of various UEs interested in multiple MBS services (e.g. configured with different numbers of G-RNTIs). In practice, the gNB should be allowed to schedule multiple multicast services to a given UE via the same G-RNTI (also considering the limited UE capability on simultaneous PDCCH detection with different RNTIs).

Similar to the G-RNTI case, contributions [9][10][15][19] [20] proposed that the mapping between G-CS-RNTI and MBS session/service can be one-to-one mapping or one-to-multiple mapping. Specifically, ($3/5$) companies proposed one-to-one mapping only while the other ($2/5$) companies proposed one-to-multiple mapping can be additionally supported.

On the other hand, contributions [22] proposed that the multiple-to-one mapping between G-RNTI and MBS session should be considered so that one-to-one mapping between G-RNTI and MBS radio bearer can be achieved. With this mapping, separate QoS treatments (i.e. different MRBs within the same MBS session may need different handling over Uu) for a specific MBS radio bearer can be provided by gNB.

Rapporteur's Summary:

($14/22$) contributions have provided proposals on the mapping relation between G-RNTI/G-CS-RNTI and MBS session. Based on these contributions, the most majority of companies ($13/14$) agree that using a one-to-one mapping between G-RNTI/G-CS-RNTI and MBS session can help to UE power saving. Specifically, ($6/14$) companies explicitly support only one-to-one mapping between G-RNTI and MBS session.

($3/14$) companies explicitly support only one-to-one mapping between G-CS-RNTI and MBS session.

($5/14$) companies explicitly propose that the one-to-multiple mapping between G-RNTI and MBS session should be also supported.

($2/14$) companies explicitly propose that the one-to-multiple mapping between G-CS-RNTI and MBS session should be also supported.

($1/15$) company considers the multiple-to-one mapping between G-RNTI and MBS session.

Therefore, the following is proposes:

Proposal 1: One-to-one mapping between G-RNTI and MBS session is supported in NR MBS. FFS one-to-multiple mapping between G-RNTI and MBS session.

Proposal 2: One-to-one mapping between G-CS-RNTI and MBS session is supported in NR MBS. FFS one-to-multiple mapping between G-CS-RNTI and MBS session.

2.1.2 Support of multiple G-RNTIs/G-CS-RNTIs

Based on P1 and P2, next, we can review the questions asked by RAN1 in the LS R2-2104710 regarding the support of multiple G-RNTIs and G-CS-RNTIs. Specifically,

| RAN1 LS R2-2104710: |
|---|
| RAN1 seeks answers from RAN2 regarding the following questions: Question 1: Whether RAN1 should consider the case of UE supporting multiple G-RNTIs? Question 2: Whether RAN1 should consider the case of UE supporting multiple G-CS-RNTIs? |

Companies in contributions [2][6][7][9][10][13][15][18] [20][21] all agreed that multiple G-RNTIs/G-CS-RNTIs can be supported based on network configuration/UE capability/ UE implementation. On the contrary, the company in contribution [19] thinks only one G-CS-RNTI is supposed to be used for PTM transmission, which is similar to the legacy NR mechanism with multiple CG configurations.

Rapporteur's Summary:

($11/22$) contributions have provided proposals on the question in the RAN1 LS. It seems a majority view ($10/11$) that multiple G-RNTIs/G-CS-RNTI can be supported by UE for both NR MBS broadcast and multicast. Therefore, the following is proposed, Proposal 3: A UE can support multiple G-RNTIs/G-CS-RNTIs. Inform RAN1 of this agreement. [ . . . ]

2.1.7 DRX

In LTE SC-PTM, group DRX is introduced for UE power saving. In NR MBS, similar DRX mechanism needs to be considered as well. Contributions [7][9][10][11][13][15][18][19][20][21][22] all proposed supporting DRX for NR MBS and had further discussed DRX related detailed operation. Overall, the majority view can be concluded as follows, MBS DRX configuration for PTM transmission is configured on a per G-RNTI basis (NOTE: a common MBS DRX configuration might be used for multiple MBS services); [7][11][13][15][18][19][21][22]

the general DRX parameters (e.g. drx-onDurationTimer, drx-SlotOffset) and timer operations of C-DRX/LTE SC-PTM DRX should be taken as baseline (e.g. for NR MBS delivery mode 2, LTE SC-PTM DRX can be directly reused); [9][15][18][20]

legacy unicast DRX pattern is reused for PTP transmission. [9][13][15][21].

Furthermore, contributions [10][15] would RAN2 to consider whether a common DRX configuration can be used for CONNECTED UE with both multicast (including PTM and/or PTP) and unicast transmission. Contribution [9] considered to configure DRX configuration for each MCCH.

Rapporteur's Summary:

($^{11}/_{22}$) contributions have provided proposals on DRX for NR MBS. Obviously, it is a majority view that DRX operation is supported in NR MBS. Then, rapporteur thinks all three conclusions mentioned above with the majority company supporting can be considered as baseline for the future detailed design of NR MBS DRX mechanism. Therefore, the following proposals are made, Proposal 14: For PTM transmission of NR MBS, DRX scheme is supported on a per G-RNTI basis (i.e. independent of DRX for unicast transmission).

Proposal 15: For NR MBS delivery mode 2, LTE SC-PTM DRX scheme is reused.

Proposal 16: For PTP transmission, DRX operation for unicast transmission is reused.

Proposal 17: For PTM transmission for multicast, NR MBS DRX configuration can include drx-onDuration timer, drx-inactivity timer, drx-long cycle start offset, drx-slot offset, drx-HARQ RTT timer DL, and drx-DL retransmission timer.

One or more parts of R2-2104876 are quoted below:

Proposal 7: DRX of MBS services via PTP transmission (RAN2) reuses the same configuration as unicast service.

Proposal 8: DRX configuration drx-onDurationTimerMBS, drx-SlotOffsetMBS, drx-InactivityTimerMBS and drx-schedulingPeriodStartOffsetMBS is used for MBS initial transmission via PTM (RAN2).

Proposal 9: For MBS retransmission via PTP (RAN1), HARQ related DRX timer drx-HARQ-RTT-TimerDL and drx-RetransmissionTimerDL are configured.

Proposal 10: HARQ related DRX timer drx-HARQ-RTT-TimerDLMBS and drx-RetransmissionTimerDLMBS are configured if PTM scheme 1 (RAN1) is used for MBS retransmission.

Proposal 11: HARQ related DRX timer drx-HARQ-RTT-TimerDL and drx-RetransmissionTimerDL are configured if PTP (RAN1) is used for MBS retransmission.

Proposal 12: HARQ related DRX timer drx-HARQ-RTT-TimerDL and drx-RetransmissionTimerDLMBS are configured if PTM scheme 2 (RAN1) is used for MBS retransmission.

Proposal 13: DRX configuration parameters for each MTCH in delivery mode 2 includes: drx-onDurationTimerMBS, drx-SlotOffsetMBS, drx-InactivityTimerMBS, drx-schedulingPeriodStartOffsetMBS, drx-RetransmissionTimerDLMBS, drx-HARQ-RTT-TimerDLMBS.

Proposal 14: DRX configuration parameters for each MCCH in delivery mode 2 includes: drx-onDurationTimerMBS, drx-SlotOffsetMBS, drx-InactivityTimerMBS, drx-schedulingPeriodStartOffsetMBS.

Proposal 15: In PTP transmission (RAN2), CS-RNTI is used for DL SPS activation/deactivation/retransmission.

Proposal 16: One-to-one mapping between G-CS-RNTI and MBS service is supported.

Proposal 17: MBS DL SPS is configured with parameters g-cs-RNTI, mbs-nrofHARQ-Processes, mbs-harq-ProcID-Offset and mbs-periodicity.

Proposal 18: G-CS-RNTI is used for MBS DL SPS activation/deactivation/retransmission if PTM scheme (RAN1) is used for DL SPS initial transmission and DL SPS HARQ retransmission in both delivery mode 1 and delivery mode 2.

Proposal 19: In delivery mode 1, G-CS-RNTI is used for activation/deactivation, CS-RNTI is used for DL SPS HARQ retransmission when PTM scheme 1 (RAN1) is used for DL SPS initial transmission and PTP (RAN1) is used for DL SPS HARQ retransmission.

Proposal 20: Reply RAN1 "UE should be considered to support multiple G-RNTI and/or multiple G-CS-RNTI. One-to-one mapping between G-RNTI/G-CS-RNTI and MBS service is supported".

One or more parts of R2-2104993 are quoted below:

2.2.1 DRX for MBS

Adhering to SCPTM principle, each MBS session can have a service specific DRX for reception with PTM mode and is associated with a specific G-RNTI. Whereas, PTP mode is closely related to legacy unicast and UE specific unicast C-DRX is suitable. There are two important aspects that need to be considered.

1. Service specific DRX for PTM is also applicable for delivery mode 2. There may be a large number of broadcast services (SC-PTM considered max 1023 services). It would be efficient from power saving as well as signaling perspective to group multiple services which share same DRX pattern (unlike SCPTM which carries separate and independent signaling for DRX configuration for each service). That is, multiple MBS PTM services can share a common DRX configuration for delivery mode 2.

2. Though PTM and PTP have different DRX i.e. service specific and UE specific DRX respectively, they may be linked in some cases for HARQ retransmissions. That is, PTM provides initial transmission and PTP carries HARQ retransmissions (addressed by C-RNTI or UE specific RNTI). This implies that PTP should be in active time to receive HARQ retransmissions. More specifically, drx-HARQ-RTT-TimerDL and drx-RetransmissionTimerDL should be operated for PTP when MBS initial transmission is received for PTM and HARQ retransmission is configured to be received through PTP.

Proposal 11: Each MBS session reception via PTM mode is associated with a service specific DRX and UE receives MBS traffic in the active time of the associated DRX Proposal 12: MBS session reception via PTP mode is associated with UE specific unicast DRX.

Proposal 13: Multiple MBS PTM services can share a common DRX configuration for delivery mode 2.

Proposal 14: For delivery mode 2, multiple MBS PTM services that share a common DRX configuration, are grouped and signalled together in MCCH.

Proposal 15: When PTM HARQ retransmission are configured to be received on PTP, PTP should be in active time to receive HARQ retransmissions. That is, drx-HARQ-RTT-TimerDL and drx-RetransmissionTimerDL are operated for PTP when MBS initial transmission is received for PTM and HARQ retransmission is configured to be received through PTP.

Figure 7:
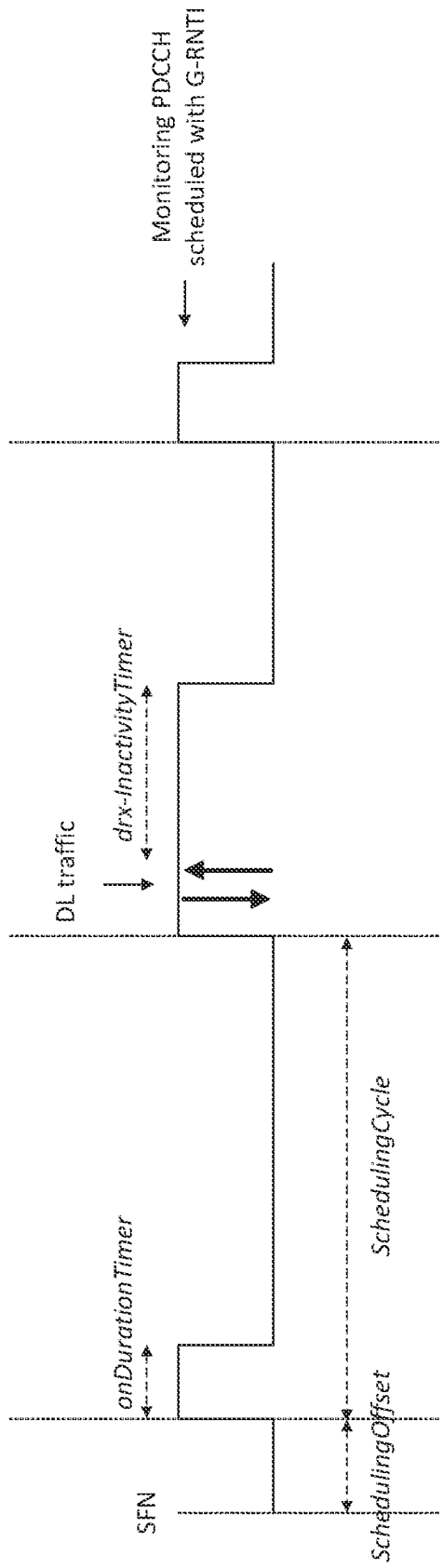
FIG. 7 is a diagram illustrating an exemplary scenario associated with a Discontinuous Reception (DRX) for Long Term Evolution (LTE) Multicast Traffic Channel (MTCH) according to one exemplary embodiment.

One or more parts of R2-2105654 are quoted below. Notably, FIG. 2 of Section 3.4 of R2-2105654, entitled "DRX cycle for LTE MTCH", is reproduced herein as FIG. 7.

3.4 DRX while Monitoring G-RNTI

DRX is a key feature for power saving in the UE. It allows the UE to stop monitoring PDCCH during periods of time when there is no data activity, thereby saving power. The DRX function consists of two parts. The static part consists of known durations the UE will monitor PDCCH in order for the network to schedule it. On top of this a dynamic part is added which adapts the UE's monitoring of PDCCH depending on the traffic. As DRX is a fundamental component to save UE power, it should also be supported for monitoring of the G-RNTI:

Proposal 11: DRX is supported for monitoring of G-RNTI on PDCCH.

In LTE the MTCH traffic channel is used to carry the multicast/broadcast data. The UE in idle/inactive mode is monitoring the MTCH when the onDurationTimer or drx-InactivityTimer are running configured for the G-RNTI, i.e. during the Active Time of the G-RNTI (36.321) as shown in FIG. 1.

FIG. 2—DRX Cycle for LTE MTCH

The drx-InactivityTimer is restarted when DL data scheduled with the G-RNTI is received. Up to 1031 SC-MTCHs can be configured in the cell for each MBMS session (G-RNTI) with its own DRX parameters. This means there is one DRX operation for unicast traffic and one DRX operation for each G-RNTI/SC-MTCH. There is a difference in the unicast DRX operation and the SC-PTM DRX operation in that the latter applies both for RRC_IDLE and RRC_CONNECTED and it lacks DRX short cycle functionality and functionality related to HARQ timers and retransmission timers. SC-PTM was designed for services with predictable characteristics (inter-arrival time, packet sizes etc) so this simplification compared to unicast DRX operation was justified. The UE simply receives the transmissions and there is no HARQ feedback for example.

The first question for DRX support for NR MBS should be if the existing DRX operation is sufficient or if there is need to introduce another DRX operation for monitoring of the G-RNTI(s). NR MBS will have some support for HARQ, so it is not possible to copy the LTE SC-PTM solution. If the UE can only be configured with a single DRX configuration, then the on duration for all UEs interested configured with an MRB have to be aligned. This is not wanted behaviour as the corresponding DRBs of the UEs have to be handled during the same duration. Thus, having DRX configurations specifically for MRBs is appropriate:

Proposal 12: Introduce MBS-specific DRX configuration, one per G-RNTI.

Secondly the question arises about the properties of the MBS-specific DRX configuration. Unicast DRX is controlled by the following parameters and MAC CEs. The table includes the usefulness to MBS DRX.

TABLE 1

Parameters and MAC CEs related to DRX configuration

| Parameter name | Explanation | Useful to MBS DRX |
|---|---|---|
| drx-onDurationTimer | The duration at the beginning of a DRX cycle | Yes |
| drx-SlotOffset | The delay before starting the drx-onDurationTimer | Yes |
| drx-InactivityTimer | The duration after the PDCCH occasion in which a PDCCH indicates a new UL or DL transmission for the MAC entity | Yes |
| drx-RetransmissionTimerDL | The maximum duration until a DL retransmission is received | Yes, if HARQ is used, otherwise no |
| drx-RetransmissionTimerUL | The maximum duration until a grant for UL retransmission is received | No, as there are no UL grants. |
| drx-LongCycleStartOffset | The Long DRX cycle and drx-StartOffset which defines the subframe where the Long and Short DRX cycle starts | Yes |
| drx-ShortCycle | The Short DRX cycle | No, not necessary |
| drx-ShortCycleTimer | The duration the UE shall follow the Short DRX cycle | No, not necessary |
| drx-HARQ-RTT-TimerDL | The minimum duration before a DL assignment for HARQ retransmission is expected by the MAC entity | Yes, if HARQ is used, otherwise no |
| drx-HARQ-RTT-TimerUL | The minimum duration before a UL HARQ retransmission grant is expected by the MAC entity | No, as there are no UL grants. |
| ps-Wakeup | The configuration to start associated drx-onDurationTimer in case DCP is monitored but not detected | No, not necessary |
| ps-TransmitOtherPeriodicCSI | The configuration to report periodic CSI that is not L1-RSRP on PUCCH during the time duration indicated by drx-onDurationTimer in case DCP is configured but associated drx-onDurationTimer is not started | No, not necessary |

TABLE 1-continued

Parameters and MAC CEs related to DRX configuration

| Parameter name | Explanation | Useful to MBS DRX |
|---|---|---|
| ps-TransmitPeriodicL1-RSRP | The configuration to transmit periodic CSI that is L1-RSRP on PUCCH during the time duration indicated by drx-onDurationTimer in case DCP is configured but associated drx-onDurationTimer is not started. | No, not necessary |
| DRX command MAC CE | MAC CE which puts the UE in DRX | Yes |
| Long DRX command MAC CE | MAC CE which puts the UE in Long DRX if short DRX is configured | No, not necessary |

Proposal 13: The MBS DRX operation supports the parameters listed in Table 1 and the baseline is that they operate (actions for start/stop/expiry etc) similar to Unicast DRX operation.

One or more parts of R2-2106283 are quoted below:

2.4 DRX Operation for MBS

For NR MBS, the gNB should inform the UE where the MBS services might be scheduled, otherwise the UE has to monitor PDCCH all the time, which is not beneficial for the UE's power consumption. In order to minimize the UE power consumption, in LTE, the DRX mechanism for SC-PTM was used. Therefore, NR should follow the same principle for MBS service to achieve the same benefits.

Proposal 8: DRX is supported for NR MBS.

According to RAN1 #103 e-meeting agreements and RAN1 #104 e-meeting agreements, there may be three transmission schemes for MBS, including PTM transmission scheme 1, PTM transmission scheme 2 and PTP transmission, while PTM transmission scheme 1 and PTP transmission have been agreed, but PTM transmission scheme 2 is not agreed yet. At the same time, MBS SPS has also be supported. For these three agreed transmission including PTM transmission scheme 1, PTP transmission and MBS SPS transmission, the impact for DRX can be discussed separately.

PTM Transmission Scheme 1:

In NR MBS, there are multiple UEs who are interested in the same MBS service and different UEs have different DRX configurations for unicast. For PTM transmission scheme 1, the UEs which are interested in the same MBS service need to receive the same DCI. However, it seems difficult to align DRX for unicast of the UEs who are interested in the same MBS service. Furthermore, considering that a UE may be interested in multiple MBS services, such kind of alignment will be even harder.

Hence, we believe DRX for PTM transmission scheme 1 should be in parallel with DRX for unicast, which is a simple approach and allows to avoid impacts on the DRX configurations for unicast.

PTP Transmission:

In existing DRX for unicast, UE needs to monitor DCI scrambled by C-RNTI during Active Time. For multicast PTP transmission, UE also needs to monitor DCI scrambled by C-RNTI. If proposal 3b is agreed, obviously, DRX for unicast should be reused for PTP transmission for multicast.

MBS SPS Transmission:

In existing DRX for unicast, the UE needs to control DRX timers for unicast DRX after a MAC PDU is received in unicast SPS. In NR MBS, similarly, the UE needs to control DRX timers for PTM DRX after a MAC PDU is received in MBS SPS.

Considering that the MAC PDU transmitted in MBS SPS is common for UEs who are interested in the same MBS service, the DRX for PTM transmission should also take into account MBS SPS transmission.

Proposal 9a: DRX for PTM transmission of broadcast and multicast shall be independent from DRX for unicast.

Proposal 9b: DRX for unicast is reused for PTP transmission for multicast.

Considering different MBS services may have different service characteristic, for PTM transmission, it should be possible to configure a different DRX configurations for each G-RNTI. Furthermore, for PTM transmission, UE should perform DRX operation for each G-RNTI to control the UE's PDCCH monitoring activity for the G-RNTI.

Proposal 10: For broadcast and multicast, UE should perform DRX operation for each G-RNTI independently.

1) Details of DRX Mechanism for Broadcast:

LTE SC-PTM does not support HARQ-ACK feedback and HARQ-based retransmission. So, there is not Retransmission Timer in DRX of LTE SC-PTM. And the Active Time for DRX of LTE SC-PTM only includes the time while onDurationTimerSCPTM or drx-InactivityTimerSCPTM is running.

In NR, broadcast also does not support HARQ-ACK feedback and HARQ-based retransmission. Obviously, LTE SC-PTM DRX mechanism can be reused in PTM transmission of broadcast.

Proposal 11: For broadcast, LTE SC-PTM DRX mechanism can be reused.

2) Details of DRX Mechanism for PTM Transmission for Multicast:

In DRX for unicast, Active Time for unicast includes the time while drx-onDurationTimer or drx-InactivityTimer or drx-RetransmissionTimerDL is running And during Active Time for unicast, the network can transmit new transmission or retransmission to UE.

Furthermore, according to the current specification, in unicast DRX, when UE receives a MAC PDU, UE starts the drx-HARQ-RTT-TimerDL for the corresponding HARQ process in the first symbol after the end of the corresponding transmission carrying the DL HARQ feedback, and UE only starts drx-RetransmissionTimerDL for the corresponding HARQ process in the first symbol after the expiry of drx-HARQ-RTT-TimerDL if the MAC PDU was not successfully decoded.

In NR MBS, multiple UEs interested in the same MBS service will receive the same DCI and MBS MAC PDU, which is different from unicast. If the DRX mechanism for unicast is directly reused in DRX for PTM transmission, Active Time of different UEs receiving the same MBS service may be not aligned in some case:

According to the DRX mechanism for unicast, only UEs that failed to receive the MBS data 1 will start drx-RetransmissionTimerDL. As a result, Active Time of the UEs that successfully received the MBS data 1 is not aligned with that of others UEs which failed to receive the MBS data 1. In this case, if network sends a new transmission MBS data 2 by PTM transmission while Retransmission Timer is running, the UEs that successfully receive MBS data 1 may be in the inactive state and cannot receive the data 2.

Considering the differences between unicast and MBS, it is not possible to directly reuse DRX mechanism in unicast for PTM transmission. Otherwise, for PTM transmission, some UEs may fail to receive new transmission transmitted during the running of Retransmission Timer.

Observation 7: Unicast DRX mechanism cannot be directly reused for PTM transmission.

In order to avoid some UEs missing new PTM transmissions during the running of Retransmission Timer, for multicast PTM transmission, if neither onDuration Timer nor Inactivity Timer is running, and Retransmission Timer of only some UEs is running, the network should not transmit new transmissions.

Proposal 12: For DRX operation for multicast PTM, if neither onDuration Timer nor Inactivity Timer is running, and Retransmission Timer of only some UEs is running, the network should not schedule new transmissions.

3) Coordination Between DRX for Unicast and DRX for PTM Transmission/MBS SPS Transmission of Multicast:

According to RAN1 #104 e-meeting agreement [5], when ACK/NACK based HARQ-ACK feedback is enabled for multicast, after the network performs initial transmission by PTM transmission for a MAC PDU, the network may perform retransmission of the MAC PDU by PTP transmission for a specific UE or perform retransmission of the MAC PDU by PTM transmission. Furthermore, according to RAN1 #104bis e-meeting agreement [9], after the network performs initial transmission by MBS SPS transmission for a MAC PDU, the network may perform retransmission of the MAC PDU by PTP transmission for a specific UE or perform retransmission of the MAC PDU by PTM transmission.

Hence, when ACK/NACK based HARQ-ACK feedback is enabled for multicast, in order to ensure that UE can receive the DCI scheduling retransmission by PTP transmission, after UE fails to receive PDSCH for PTM scheduling/MBS SPS transmission, DRX for unicast should also allow the UE to monitor the retransmission scheduled by PTP.

Proposal 13: For multicast, when the UE fails to receive PDSCH for PTM transmission, DRX for unicast should be adapted to allow the UE to monitor the retransmission scheduled by PTP.

One or more parts of R2-2108846 are quoted below:
2.2 Power Saving
2.2.1 Multicast Connected State DRX
In NR, Unicast DRX is supported to enable UE to sleep when there is no data traffic to send and receive. Contributions [1][2][3][5][8][10][11][12][15][16][18][19][20][23][24][26][27][28] all proposed to support Multicast DRX, which is different from Unicast DRX. These contributions discussed multiple proposals related to Multicast DRX configuration for PTM and PTP transmission. Overall, it can be concluded from the contributions that, MBS DRX pattern for MBS reception via PTM mode is configured on a per G-RNTI basis (NOTE: a common MBS DRX pattern can be used for multiple Multicast services);

the general DRX parameters (e.g. drx-onDurationTimer, drx-SlotOffset) and timer operations of ue-specific C-DRX for unicast should be taken as baseline;

legacy unicast DRX pattern is reused for MBS reception via PTP mode.

DL RTT and DL Re-Transmissions timer start details

Multicast PTM DRX has to take G-RNTI based HARQ initial transmission and re-transmission can be either G-RNTI or C-RNTI based.

Rapporteur's Summary:

All contributions agree that Multicast DRX operation is supported and is independent of Unicast DRX. Therefore, the following proposals need to be discussed, Proposal 11: For multicast PTM transmission, Multicast DRX pattern is configured on a per G-RNTI basis (i.e. independent of legacy UE-specific DRX for unicast transmission).

Proposal 12: As network configuration, multiple Multicast services can be associated with one Multicast DRX pattern.

Proposal 13: Legacy UE-specific DRX pattern for unicast is reused for PTP transmission of NR MBS, which means the UE specific DRX pattern are for both unicast services and the MBS PTP bearer of UE Proposal 14: Multicast long DRX support is baseline. FFS whether to support optional short DRX for Multicast or not.

Proposal 15: The Multicast Long DRX operation has to support the following parameters which are similar to the UE-specific DRX for unicast, where the last two parameters are needed if the HARQ-feedback is enabled:

drx-onDurationTimerPTM
    drx-InactivityTimerPTM
    drx-LongCycleStartOffsetPTM
    drx-SlotOffsetPTM
    drx-HARQ-RTT-TimerDLPTM
    drx-RetransmissionTimerDLPTM Proposal 16: During PTM Multicast DRX active period, UE monitors both G-RNTI and C-RNTI (for receiving C-RNTI based unicast HARQ re-transmissions assuming gNB can use configured Multicast Search Space to schedule either by G-RNTI or C-RNTI).

Proposal 17. For Multicast HARQ ACK/NACK feedback using UE specific PUCCH resources, RAN2 to discuss following 2 options Option 1: gNB can configure HARQ RTT and DL Re-transmission timer to take into different UEs PUCCH resource feedback time into account as gNB implementation.

Option 2: gNB can indicate UEs to start HARQ RTT timer from the end of GC-PDCCH or GC-PDSCH reception and UEs still triggers HARQ RTT timer after UE specific NACK transmission while RTT timer counts from multicast GC-PDCCH/GC-PDSCH reception.

Proposal 18. For group common PTM Multicast HARQ PUCCH resources (NACK only feedback), the same group of UEs have aligned HRAQ RTT and DL Re-Tx timer configuration. HARQ RTT timer counting starts from end of common PUCCH resource based NACK transmission (i.e. same as Unicast DRX behaviour).

2.2.2 Broadast DRX

Contributions [1][2][4][5][8][19][23] discussed about Broadcast DRX configuration aspects. Based on these papers, below are summary proposals:

Proposal 19: For NR Broadcast, the DRX pattern is configured per G-RNTI. Multiple NR Broadcast services can share common DRX pattern and is up to network configuration.

Proposal 20: For NR Broadcast, DRX configuration includes: drx-onDurationTimerPTM, drx-SlotOffsetPTM, drx-InactivityTimerPTM, drx-CycleStartOffsetPTM.

2.2.3 MBS WUS

Contribution [4] discussed about WUS aspects for Multicast PTP reception.

PTP is expected to re-use Unicast DRX and it is reasonable to to use PDCCH WUS for Multicast PTP reception. For PTM WUS requires additional work and can be discussed later if time permits.

Contribution [1] proposed not to support R16 power saving mechanisms.

Proposal 21: PDCCH WUS is applicable for Multicast data reception via PTP RLC (i.e. assuming Unicast DRX is used for PTP).

One or more parts of RP-212266 are quoted below:

2.2 RAN2

2.2.1 Agreements

RAN2 #115-e Agreements

L2 Related:
- MRB configuration and procedures in RRC are separated from DRB configuration and procedures (as in current CR).
- MRB is defined as MBS Radio Bearer, which denotes radio bearers carrying both multicast and broadcast sessions.
- In RRC signalling, one MRB can be configured with PTM only or PTP only or both PTM and PTP. Whether PTM, PTM+PTP or PTP-only can be changed from one to other via RRC signaling.
- In RRC signalling, Support DL only UM RLC configuration for PTM, both DL and UL AM RLC configuration for PTP, DL only UM RLC configuration for PTP, FFS both DL and UL UM RLC configuration for PTP.
- FFS whether PDCP SR can be triggered due to bearer type change in RRC signaling and FFS how to trigger PDCP SR if need.
- Will not support PTM deactivation/activation beyond RRC reconfiguration acc to first agreement above (and whatever R1 decides).
- For PTM PDCP state variables setting while configured, the SN part of COUNT values of these variables are set according to the SN of the first received packet (by the UE) and the HFN indicated by the gNB, if needed.
- Initialize the PTM RLC entity for an MRB configuration, the value of RX_Next_Highest and RX_Next_Reassembly are set according to the SN of the first received packet containing an SN.
- RLC state variables of PTP RLC reception window can be set to initial value, i.e. 0, due to MRB configuration.
- Single bearer ID is used for each Multicast RB. FFS whether DRB ID space can be shared with MRB ID.
- FFS whether to share common LCID space for Multicast PTM and Unicast DTCH. FFS How many PTM LCIDs to be reserved if separate space is used.
- Multicast PTP and Unicast DTCH/DRB share common LCID space.
- Broadcast PTM/MTCH uses reserved LCID(s), which is different than Unicast DTCH/DRB LCID space.
- Broadcast MCCH uses reserved LCID.
- Multiplexing/de-multiplexing of different logical channels associated with the same G-CS-RNTI is supported for NR MBS.
- If Data Inactivity timer is configured, data monitoring is applied both for unicast and MBS multicast (i.e. both PTM and PTP data) (but not MBS broadcast)
- For multicast PTM transmission, Multicast DRX pattern is configured on a per G-RNTI basis (i.e. independent of legacy UE-specific DRX for unicast transmission).
- Legacy UE-specific DRX pattern for unicast is reused for PTP transmission of NR MBS, which means the UE specific DRX pattern are for both unicast services and the MBS PTP bearer of UE
- Multicast long DRX support is baseline for PTM. FFS whether to support optional short DRX or not.
- The Multicast Long DRX operation has to support the following parameters which are similar to the UE-specific DRX for unicast, where the last two parameters are needed if the HARQ-feedback is enabled:
  drx-onDurationTimerPTM
  drx-InactivityTimerPTM
  drx-LongCycleStartOffsetPTM
  drx-SlotOffsetPTM
  drx-HARQ-RTT-TimerDLPTM
  drx-RetransmissionTimerDLPTM
- For NR Broadcast, the DRX pattern is configured per G-RNTI.
- For NR Broadcast, DRX configuration includes: drx-onDurationTimerPTM, drx-SlotOffsetPTM, drx-InactivityTimerPTM, drx-CycleStartOffsetPTM.
- ROHC O/R-mode can be used for MRB, for cases when feedback path is available (UL RLC). R2 assumes the detailed operation is up to implementation and expect no further optimizations to be needed.
- Reflective QoS is not supported for MBS.
- No SDAP header is needed for MBS.
- Add p7 to stage-2 CR discussion A first Discontinuous Reception (DRX) (e.g., a first DRX pattern and/or a first DRX configuration) may be associated with a Group Radio Network Temporary Identifier (G-RNTI) that may correspond to a multicast service. A network (e.g., a gNB) may transmit data (e.g., a transport block (TB) and/or a Medium Access Control Protocol Data Unit (MAC PDU)) to a plurality of UEs by multicast (e.g., using the multicast service associated with the G-RNTI). For example, the transmission of the data may be an initial transmission of the data (e.g., the initial transmission of the data may be a new transmission of the data and/or may not be a retransmission of the data). The transmission of the data (and/or the data in the transmission of the data) may be addressed to the G-RNTI associated with the first DRX. In some examples, if the data is not successfully decoded by a UE (e.g., a UE of the plurality of UEs), such as where the UE does not successfully decode the data carried by the transmission of the data (e.g., multicast transmission of data) from the network, the network may retransmit the data to the UE. The retransmission of the data (and/or the data in the retransmission of the data) may be addressed to a Cell Radio Network Temporary Identifier (C-RNTI) (e.g., a C-RNTI associated with the UE that did not successfully decode the initial transmission of the data). The UE (that did not successfully decode the initial transmission of the data, for example) may be configured with a second DRX associated with the C-RNTI (to which the retransmission of the data is addressed, for example), wherein the second DRX associated with the C-RNTI is different than the first DRX associated with the G-RNTI (e.g., the second DRX may correspond to a second DRX pattern and/or a second DRX configuration different than the first DRX pattern and/or the first DRX configuration, respectively). Accordingly, coordination between the two DRXs (e.g., the first DRX, associated with the G-RNTI to which the initial transmission of the data is addressed, and the second DRX associated with the C-RNTI to which the retransmission of the data is addressed) may be required for data reception.

When a UE receives/detects data (e.g., a TB and/or a MAC PDU), addressed to a G-RNTI for a Hybrid Automatic Repeat Request (HARM) process, from a network (e.g., a gNB) and the UE does not decode the data successfully (e.g., the UE may transmit HARQ feedback indicative of Negative Acknowledgment (NACK) based on not successfully decoding the data, wherein the HARQ feedback be associated with the HARQ process), the UE may start a G-RNTI DRX retransmission timer associated with the G-RNTI for the HARQ process (e.g., the G-RNTI DRX retransmission timer may be drx-RetransmissionTimerDLPTM) and the UE may or may not start a C-RNTI DRX retransmission timer associated with a C-RNTI for the HARQ process (e.g., the C-RNTI DRX retransmission timer may be drx-RetransmissionTimerDL). In the present disclosure, the term "receives/detects" may refer to "receives and/or detects". For example, the UE may start the C-RNTI retransmission timer upon expiry of a HARQ Round Trip Time (RTT) timer associated with the G-RNTI for the HARQ process. In some examples, the HARQ RTT timer (associated with the G-RNTI for the HARQ process) is started (by the UE, for example) upon transmission of HARQ feedback (e.g., Acknowledgment (ACK)/NACK feedback) after reception/detection of the data from the network. The HARQ feedback may be indicative of whether or not the data is decoded successfully by the UE. In some examples, the UE may determine to start the C-RNTI retransmission timer based on information (e.g., one or more indications) of a Physical Downlink Control Channel (PDCCH) and/or a Radio Resource Control (RRC) configuration. The information of the PDCCH and/or the RRC configuration indicates that C-RNTI transmission may occur for the multicast transmission (e.g., the transmission of the data addressed to the G-RNTI) for the same data (e.g., the same TB and/or MAC PDU). For example, the C-RNTI transmission may correspond to a retransmission of the data that is transmitted (e.g., initially transmitted) via the multicast transmission addressed to the G-RNTI for the HARQ process.

When a UE receives/detects data (e.g., a TB and/or a MAC PDU), addressed to a C-RNTI for a HARQ process, from a network (e.g., a gNB) and the UE does not decode the data successfully (e.g., the UE may transmit HARQ feedback indicative of NACK based on not successfully decoding the data, wherein the HARQ feedback be associated with the HARQ process), the UE may start a C-RNTI DRX retransmission timer associated with the C-RNTI for the HARQ process (e.g., the C-RNTI DRX retransmission timer may be drx-RetransmissionTimerDL) and the UE may or may not start a G-RNTI DRX retransmission timer associated with a G-RNTI for the HARQ process (e.g., the G-RNTI DRX retransmission timer may be drx-RetransmissionTimerDLPTM). For example, the UE may start the G-RNTI retransmission timer upon expiry of a HARQ RTT timer associated with the G-RNTI for the HARQ process. In some examples, the HARQ RTT timer (associated with the G-RNTI for the HARQ process) is started (by the UE, for example) upon transmission of HARQ feedback (e.g., ACK/NACK feedback) after reception/detection of the data from the network. The HARQ feedback may be indicative of whether or not the data is decoded successfully by the UE.

In the present disclosure, the terms "multicast retransmission timer", "group retransmission timer", "G-RNTI retransmission timer", and/or "G-RNTI DRX retransmission timer" may be used interchangeably. Alternatively and/or additionally, the terms "unicast retransmission timer", "C-RNTI retransmission timer", and/or "C-RNTI DRX retransmission timer" may be used interchangeably.

If a network (e.g., a gNB) receives a NACK (e.g., any NACK) associated with multicast transmission of data to UEs (and/or if the network does not receive all ACK from UEs associated with the multicast transmission), the network may retransmit the data through multicast (associated with G-RNTI, for example) and unicast (associated with C-RNTI, for example) for different UEs, wherein the retransmissions of the data to the UEs (through multicast and unicast) may be performed at the same time and/or within a window of time that is smaller than a threshold duration of time. For example, the retransmissions of the data for the different UEs may comprise a retransmission of the data (addressed to the G-RNTI, for example) through multicast for one or more first UEs and one or more retransmissions of the data (addressed to one or more C-RNTIs, for example) through unicast for one or more second UEs. When a UE receives/detects a retransmission (of the retransmissions of the data, for example), addressed to a G-RNTI for the HARQ process, the UE may stop both a G-RNTI retransmission timer and a C-RNTI retransmission timer. The UE may not continue to monitor PDCCH for C-RNTI retransmission and may lose (e.g., miss and/or not detect) a retransmission addressed to C-RNTI.

In an example scenario, a network (e.g., a gNB) may perform a multicast transmission of data (e.g., a TB and/or a MAC PDU), addressed to a G-RNTI for a HARQ process, to a plurality of UEs. The network may perform retransmissions of the data if (i) the network receives a NACK (e.g., any NACK) associated with the multicast transmission of the data from a UE of the plurality of UEs (such as where the NACK is indicative of the data not being decoded successfully by a UE of the plurality of UEs), and/or (ii) the network does not receive, from every UE of the plurality of UEs, an ACK indicating successful reception and/or successful decoding of the data. The retransmissions of the data may comprise a first multicast retransmission of the data (addressed to the G-RNTI for the HARQ process, for example) and one or more first unicast retransmissions of the data (addressed to one or more C-RNTIs for the HARQ process, for example). The retransmissions of the data may be performed for different UEs, such as UEs (of the plurality of UEs, for example) that did not successfully decode the data via the multicast transmission of the data. For example, the first multicast retransmission of the data may be performed for one or more first UEs (of the plurality of UEs, for example) and the one or more first unicast retransmissions of the data (addressed to one or more C-RNTIs, for example) may be performed for one or more second UEs (of the plurality of UEs, for example). In some examples, the retransmissions of the data may be performed at the same time or within a window of time that is smaller than a threshold duration of time. When a UE (of the plurality of UEs, for example) receives/detects a retransmission (of the retransmissions of the data, for example), addressed to the G-RNTI for the HARQ process (e.g., when the UE receives the first multicast retransmission of the data), the UE may stop both a G-RNTI retransmission timer associated with the G-RNTI and a C-RNTI retransmission timer associated with a C-RNTI for the HARQ process. The UE may not continue to monitor PDCCH for C-RNTI retransmission (addressed to the C-RNTI, for example) and may lose (e.g., miss and/or not detect) a retransmission addressed to the C-RNTI. For example, the UE may stop monitoring PDCCH for C-RNTI retransmission when the UE stops the C-RNTI retransmission timer associated with the C-RNTI. Alternatively and/or additionally, in some examples, the UE does not monitor PDCCH for C-RNTI retransmission when the C-RNTI retransmission timer associated with the C-RNTI is not running.

In some examples, if the network (e.g., the gNB) decides to retransmit the data through multicast (e.g., associated with the G-RNTI) and unicast (e.g., associated with the C-RNTI) for different UEs, network (e.g., a gNB) should ensure that unicast retransmissions (e.g., all unicast retransmissions, such as all unicast retransmissions of the one or more first unicast retransmissions of the data) are performed earlier than the multicast retransmission (e.g., the first multicast retransmission of the data). In this way, the network may ensure that multicast UEs (e.g., all multicast UEs) are still awake for retransmission reception (e.g., reception of retransmissions of the data) and/or that DRX retransmission timers (of the multicast UEs, for example) for multicast are still running.

In some examples, if a UE receives/detects a transmission (e.g., a retransmission) addressed to a C-RNTI for a HARQ process, the UE stops a C-RNTI retransmission timer for the HARQ process and does not stop a G-RNTI retransmission timer for the same HARQ process (e.g., the UE does not stop the G-RNTI retransmission timer in response to receiving/detecting the transmission addressed to the C-RNTI, such as where the UE keeps the G-RNTI retransmission timer running if the timer is running when the UE receives/detects the transmission addressed to the C-RNTI). For example, the UE may receive/detect a G-RNTI retransmission later than the C-RNTI transmission (e.g., the transmission addressed to the C-RNTI) for the HARQ process. The UE may perform HARQ combining and decoding for the C-RNTI and G-RNTI transmissions. In some examples, if the UE transmits an ACK and/or if the UE decodes the data successfully for the transmission (e.g., the retransmission) addressed to C-RNTI for the HARQ process, the UE may stop the corresponding G-RNTI retransmission timer and/or G-RNTI HARQ RTT timer.

In an example scenario, a UE may receive/detect a transmission (e.g., a retransmission) addressed to a C-RNTI for a HARQ process. In response to (e.g., upon) receiving the transmission (e.g., the retransmission) addressed to the C-RNTI for the HARQ process, the UE stops a C-RNTI retransmission timer (associated with the C-RNTI) for the HARQ process and does not stop a G-RNTI retransmission timer associated with a G-RNTI for the HARQ process (e.g., the UE does not stop the G-RNTI retransmission timer in response to receiving/detecting the transmission addressed to the C-RNTI, such as where the UE keeps the G-RNTI retransmission timer running if the timer is running when the UE receives/detects the transmission addressed to the C-RNTI). The UE may receive/detect a G-RNTI retransmission later than the C-RNTI transmission (e.g., the transmission addressed to the C-RNTI) for the HARQ process. The G-RNTI retransmission may be addressed to the G-RNTI for the HARQ process. The UE may perform HARQ combining and decoding for the C-RNTI transmission and the G-RNTI retransmission. In some examples, if the UE transmits an ACK (e.g., the ACK may be indicative of the UE having successfully received and/or decoded data via the C-RNTI transmission) and/or if the UE successfully decodes data received via the C-RNTI transmission (e.g., the retransmission) addressed to the C-RNTI for the HARQ process, the UE may stop the G-RNTI retransmission timer associated with the G-RNTI for the HARQ process and/or the UE may stop a G-RNTI HARQ RTT timer associated with the G-RNTI for the HARQ process. For example, the UE may stop the G-RNTI retransmission timer and/or the G-RNTI HARQ RTT timer in response to (e.g., upon) transmission of the ACK and/or successfully decoding the data received via the C-RNTI transmission (e.g., the retransmission) addressed to the C-RNTI.

In some examples, if a UE receives/detects a transmission (e.g., a retransmission) addressed to a G-RNTI for a HARQ process, the UE stops a G-RNTI retransmission timer (if the G-RNTI retransmission timer is running, for example) for the HARQ process and does not stop a C-RNTI retransmission timer for the same HARQ process (e.g., the UE does not stop the C-RNTI retransmission timer in response to receiving/detecting the transmission to the G-RNTI, such as where the UE keeps the C-RNTI retransmission timer running if the C-RNTI retransmission timer is running when the UE receives/detects the transmission addressed to the G-RNTI). For example, the UE may receive/detect a C-RNTI retransmission later than the G-RNTI transmission (e.g., the transmission addressed to the G-RNTI) for the HARQ process.

Alternatively and/or additionally, whether or not the UE stops the C-RNTI retransmission timer (and/or keeps the C-RNTI retransmission timer) running may be based on whether or not an earlier transmission for the HARQ process (e.g., a most recent transmission for the HARQ process earlier than the transmission addressed to the G-RNTI and/or any transmission for the HARQ process that is earlier than the transmission addressed to the G-RNTI) is addressed to C-RNTI.

In a first example, the UE may determine that an earlier transmission for the HARQ process is addressed to the C-RNTI. The earlier transmission may correspond to a transmission that was received/detected by the UE via the HARQ process prior to reception/detection of the transmission addressed to the G-RNTI. For example, the earlier transmission may correspond to a most recently received/detected transmission of the HARQ process prior to the transmission addressed to the G-RNTI. Based on the determination that the earlier transmission for the HARQ process is addressed to the C-RNTI, the UE may not stop the C-RNTI retransmission timer and/or may keep the C-RNTI retransmission timer running (if the C-RNTI retransmission timer is running, for example). For example, based on the determination that the earlier transmission for the HARQ process is addressed to the C-RNTI, the UE may not stop the C-RNTI retransmission timer in response to receiving/detecting the transmission addressed to the G-RNTI.

In a second example, the UE may determine that (i) an earlier transmission for the HARQ process is not addressed to the C-RNTI (e.g., the earlier transmission may correspond to a transmission that was received/detected by the UE via the HARQ process prior to reception/detection of the transmission addressed to the G-RNTI, such as a most recently received/detected transmission of the HARQ process prior to the transmission addressed to the G-RNTI) and/or (ii) there is no earlier transmission for the HARQ process that is addressed to the C-RNTI (e.g., there is no transmission that (i) was addressed to the C-RNTI, and (ii) was received/detected by the UE via the HARQ process prior to reception/detection of the transmission addressed to the G-RNTI). Based on the determination that the earlier transmission for the HARQ process is not addressed to the C-RNTI and/or that there is no earlier transmission for the HARQ process that is addressed to the C-RNTI, the UE may stop the C-RNTI retransmission timer (and/or a C-RNTI HARQ RTT timer associated with the C-RNTI). For example, based on the determination that the earlier transmission for the HARQ process is not addressed to the C-RNTI and/or that there is no earlier transmission for the HARQ process that is addressed to the C-RNTI, the UE may stop the C-RNTI retransmission timer (and/or the C-RNTI HARQ RTT timer) in response to receiving/detecting the transmission to the G-RNTI. For example, in response to the receiving/detecting the transmission addressed to the G-RNTI, the UE may stop the C-RNTI retransmission timer (and/or the C-RNTI HARQ RTT timer) in addition to stopping the G-RNTI retransmission timer.

In some examples, if the UE transmits an ACK and/or if the UE decodes the data successfully for the transmission (e.g., the retransmission) addressed to G-RNTI for the HARQ process, the UE may stop the corresponding C-RNTI retransmission timer and/or the C-RNTI HARQ RTT timer. In an example, if the UE transmits an ACK (e.g., the ACK may be indicative of the UE having successfully received and/or decoded data via the G-RNTI transmission) and/or if the UE successfully decodes data received via the G-RNTI transmission (e.g., the retransmission) addressed to the G-RNTI for the HARQ process, the UE may stop the C-RNTI retransmission timer associated with the C-RNTI for the HARQ process and/or the UE may stop the C-RNTI HARQ RTT timer associated with the C-RNTI for the HARQ process. For example, the UE may stop the C-RNTI retransmission timer and/or the C-RNTI HARQ RTT timer in response to (e.g., upon) transmission of the ACK and/or successfully decoding the data received via the G-RNTI transmission (e.g., the retransmission) addressed to the G-RNTI.

Figure 8A:
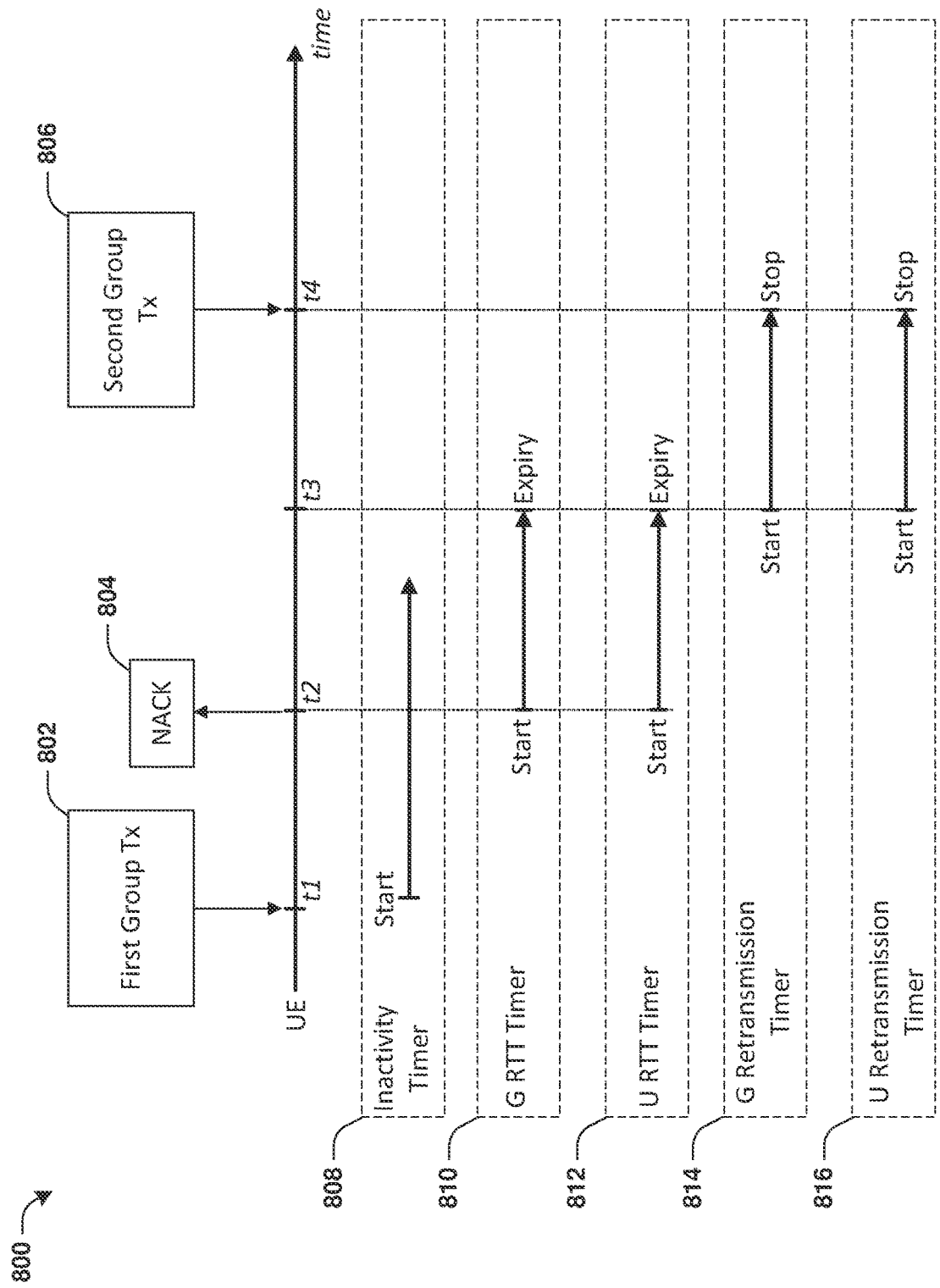
FIG. 8A is a diagram illustrating an exemplary scenario associated with handling retransmission timers and/or Hybrid Automatic Repeat Request (HARQ) Round Trip Time (RTT) timers according to one exemplary embodiment.
Figure 8C:
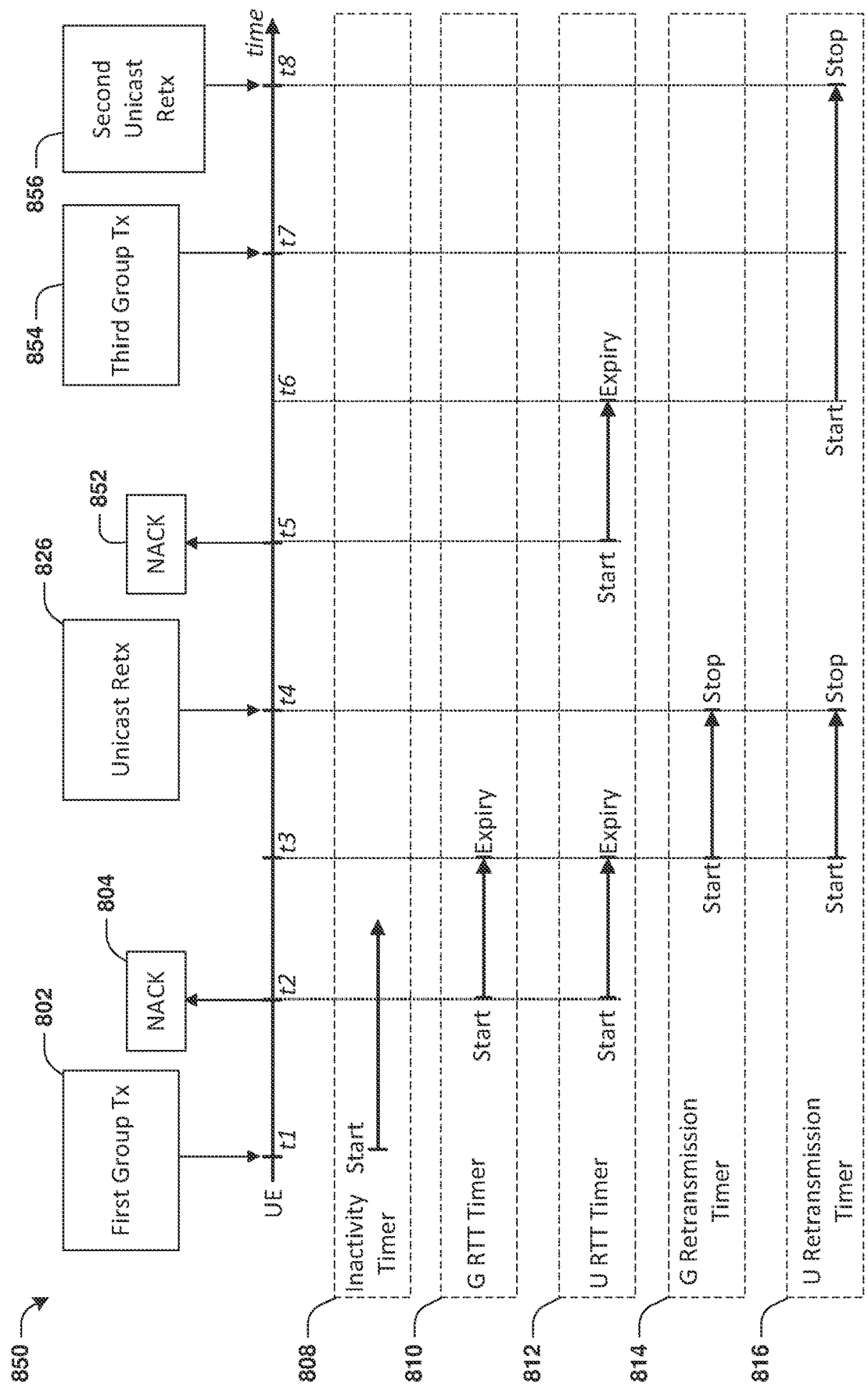
FIG. 8C is a diagram illustrating an exemplary scenario associated with handling retransmission timers and/or HARQ RTT timers according to one exemplary embodiment.

FIGS. 8A-8C illustrate timing diagrams of example scenarios associated with handling retransmission timers and/or HARQ RTT timers. In FIGS. 8A-8C, a UE has an inactivity timer 808, a group RTT timer 810 (e.g., a G-RNTI HARQ RTT timer associated with multicast transmission and/or a G-RNTI), a unicast RTT timer 812 (e.g., a C-RNTI HARQ RTT timer associated with unicast transmission and/or a C-RNTI), a group retransmission timer 814 (e.g., a multicast retransmission timer, a G-RNTI retransmission timer) and/or a unicast retransmission timer 816 (e.g., a C-RNTI retransmission timer). In some examples, the group RTT timer 810, the unicast RTT timer 812, the group retransmission timer 814 and/or the unicast retransmission timer 816 are associated with (e.g., used for) a HARQ process (e.g., the same HARQ process). In some examples, the group RTT timer 810 is the same as the unicast RTT timer 812. Alternatively and/or additionally, the group RTT timer 810 may be different than the unicast RTT timer 812.

In a first example scenario 800 illustrated in FIG. 8A, the UE may receive/detect a first group transmission 802 at time t1 from a network (e.g., a gNB). The first group transmission 802 may comprise a multicast transmission and/or may be addressed to the G-RNTI. At or after the time t1, the UE may start the inactivity timer 808. For example, the inactivity timer 808 may be utilized to keep the UE active for monitoring PDCCH based upon receiving/detecting the first group transmission 802 (e.g., the UE may monitor PDCCH while the inactivity timer 808 is running). The UE may transmit a NACK 804 at time t2 (e.g., the NACK 804 may be transmitted in response to the first group transmission 802). The NACK 804 may be transmitted based on the UE not successfully decoding the data carried by the first group transmission 802. The NACK 804 may be indicative of the UE not successfully decoding the data carried by the first group transmission 802. In some examples, in response to transmitting the NACK 804, the UE may start the group RTT timer 810 and the unicast RTT timer 812. For example, the UE may start the group RTT timer 810 and the unicast RTT timer 812 at or after time t2. In the first example scenario 800, the group RTT timer 810 and the unicast RTT Timer 812 expire at time t3 (e.g., the group RTT timer 810 and the unicast RTT Timer 812 both expire at time t3 if the group RTT timer 810 and the unicast RTT Timer 812 are the same timer, for example). Alternatively and/or additionally, the group RTT timer 810 and the unicast RTT Timer 812 may expire at different times (if the group RTT timer 810 and the unicast RTT Timer 812 are different timers, for example). The UE may start (at time t3, for example) the group retransmission timer 814 in response to (e.g., upon) expiry of the group RTT timer 810. The UE may start (at time t3, for example) the unicast retransmission timer 816 in response to (e.g., upon) expiry of the unicast RTT timer 812. At time t4, the UE may receive/detect a second group transmission 806 from the network. The second group transmission 806 may be a multicast transmission and/or may be addressed to the G-RNTI. The second group transmission 806 may be a transmission of the same data transmitted via the first group transmission 802. The UE may stop (at time t4, for example) the group retransmission timer 814 and the unicast retransmission timer 816 in response to receiving/detecting the second group transmission 806.

In a second example scenario 825 illustrated in FIG. 8B, the UE may receive/detect a first unicast retransmission 826 at time t4 (rather than or in addition to receiving/detecting the second group transmission 806 of the first example scenario 800 shown in FIG. 8A). The first unicast retransmission 826 may be addressed to the C-RNTI. The first unicast retransmission 826 may be a transmission of the same data transmitted via the first group transmission 802. The UE may stop (at time t4, for example) the group retransmission timer 814 and the unicast retransmission timer 816 in response to receiving/detecting the first unicast retransmission 826.

In a third example scenario 850 illustrated in FIG. 8C, the UE may transmit a NACK 852 at time t5 (e.g., the NACK 852 may be transmitted in response to the first unicast retransmission 826). The NACK 852 may be transmitted based on the UE not successfully decoding the data carried by the first unicast retransmission 826. The NACK 852 may be indicative of the UE not successfully decoding the data carried by the first unicast retransmission 826. In some examples, in response to transmitting the NACK 852, the UE may not start the group RTT timer 810 and may start the unicast RTT timer 812. For example, the UE may not start the group RTT timer 810 and may start the unicast RTT timer 812 at or after time t5 (e.g., only the unicast RTT timer 812 may be started by the UE, at or after time t5, in response to transmitting the NACK 852). The unicast RTT Timer 812 may expire at time t6. The UE may start (at time t6, for example) the unicast retransmission timer 816 in response to (e.g., upon) expiry of the unicast RTT timer 812. At time t7, the UE may receive/detect a third group transmission 854 from the network. The third group transmission 854 may be a multicast transmission and/or may be addressed to the G-RNTI. The third group transmission 854 may be a transmission of the same data transmitted via the first group transmission 802 and the first unicast retransmission 826. In some examples, the UE does not stop the unicast retransmission timer 816 (e.g., the UE does not stop the unicast retransmission timer 816 in response to receiving/detecting the third group transmission 854). For example, the UE may keep the unicast retransmission timer 816 running when the third group transmission 854 is received/detected.

In some examples, the UE does not stop the unicast retransmission timer 816 in response to receiving/detecting the third group transmission 854 based upon a determination that an earlier transmission for the HARQ process (e.g., a most recent transmission for the HARQ process earlier than the third group transmission 854 and/or any transmission for the HARQ process that is earlier than the third group transmission 854) is addressed to the C-RNTI. For example, the UE may not stop the unicast retransmission timer 816 in response to receiving/detecting the third group transmission 854 based upon the earlier transmission being the first unicast retransmission 826 (addressed to the C-RNTI, for example).

As shown in FIG. 8C, the UE may receive/detect a second unicast retransmission 856 at time t8. The second unicast retransmission 856 may be addressed to the C-RNTI. The second unicast retransmission 856 may be a transmission of the same data transmitted via the first group transmission 802, the first unicast retransmission 826 and the third group transmission 854. The UE may stop (at time t8, for example) the unicast retransmission timer 816 in response to receiving/detecting the second unicast retransmission 856.

Alternatively and/or additionally, the UE may transmit a NACK (not shown in FIG. 8C) to the network between time t7 (associated with the third group transmission 854) and time t8 (associated with the second unicast retransmission 856). For example, the NACK may be transmitted in response to the third group transmission 854. The NACK may be transmitted based on the UE not successfully decoding the data carried by the third group transmission 854. The NACK may be indicative of the UE not successfully decoding the data carried by the third group transmission 854. In some examples, the UE does not start the group retransmission timer 814 in response to transmitting the NACK. In some examples, the UE does not stop the unicast retransmission timer 816 in response to transmitting the NACK. In some examples, the group retransmission timer 814 is not running during a period of time between time t7 and time t8, while the UE may keep the unicast retransmission timer 816 running from time t6 to time t8 (e.g., the UE may keep the unicast retransmission timer 816 at least until time t8 when the UE receives/detects the second unicast retransmission 856). Accordingly, in some examples, the UE receives/detects the data (associated with the HARQ process, for example) via the second unicast retransmission 856 without having to monitor for multicast transmissions of the data during the period of time in which the group retransmission timer 814 is not running.

Embodiments are contemplated in which the UE starts the group retransmission timer 814 in response to transmitting the NACK (and/or in response to not successfully decoding the data carried by the third group transmission 854, for example).

Alternatively and/or additionally, the UE may transmit an ACK (not shown in FIG. 8C) to the network between time t7 (associated with the third group transmission 854) and time t8. For example, the ACK may be transmitted in response to the third group transmission 854. The ACK may be transmitted based on the UE successfully decoding the data carried by the third group transmission 854. The ACK may be indicative of the UE successfully decoding the data carried by the third group transmission 854. In some examples, the UE stops the unicast retransmission timer 816 in response to transmitting the ACK and/or in response to successfully decoding the data carried by the third group transmission 854. In this example, the UE may not receive/detect the second unicast retransmission 856 at time t8.

In some examples, a UE receives/detects a G-RNTI transmission addressed to a G-RNTI for a HARQ process. In some examples, if an earlier transmission for the HARQ process (e.g., a most recent transmission for the HARQ process earlier than the G-RNTI transmission and/or any transmission for the HARQ process that is earlier than the G-RNTI transmission) was addressed to a C-RNTI and/or if the earlier transmission (received/detected by the UE, for example) was a transmission of the same data transmitted via the G-RNTI transmission (e.g., the earlier transmission and the G-RNTI transmission both comprise transmission of the same data, such as the same TB and/or MAC PDU), the UE may not start a HARQ RTT timer for the G-RNTI (e.g., the HARQ RTT timer for the G-RNTI may be drx-HARQ-RTT-TimerDLPTM) for the HARQ process in response to (e.g., upon) reception/detection of the G-RNTI transmission (e.g., the UE may not start the HARQ RTT timer at a timing associated with transmitting HARQ feedback, such as HARQ feedback associated with the G-RNTI transmission).

In some examples, the UE determines whether or not to stop a C-RNTI retransmission timer for a HARQ process based on whether a received/detected transmission of data is an initial transmission of the data (e.g., a new transmission of the data) or a retransmission of the data (e.g., whether or not the UE stops the C-RNTI retransmission timer in response to receiving/detecting the transmission of the data depends on whether or not the transmission of the data is an initial transmission of the data or a retransmission of the data).

In an example, if the transmission of the data is an initial transmission of the data (e.g., a new transmission of the data), the UE may stop both a G-RNTI retransmission timer (if the G-RNTI retransmission timer is running, for example) and the C-RNTI retransmission timer for the HARQ process. For example, the UE may stop the G-RNTI retransmission timer and the C-RNTI retransmission timer for the HARQ process in response to receiving/detecting the transmission of the data if the transmission of the data is an initial transmission of the data (e.g., the transmission of the data may be addressed to C-RNTI or to G-RNTI).

In an example, if the transmission of the data is a retransmission of the data and the transmission of the data is addressed to G-RNTI for the HARQ process, the UE stops the G-RNTI retransmission timer (if the G-RNTI retransmission timer is running, for example) for the HARQ process and does not stop the C-RNTI retransmission timer (e.g., the UE keeps the C-RNTI retransmission timer for the same HARQ process running). For example, the UE may stop the G-RNTI retransmission timer and may keep the C-RNTI retransmission timer running in response to receiving/detecting the transmission of the data if the transmission of the data is a retransmission of the data and is addressed to G-RNTI for the HARQ process.

In an example, if the transmission of the data is a retransmission of the data and the transmission of the data is addressed to C-RNTI for the HARQ process, the UE stops the C-RNTI retransmission timer (if the C-RNTI retransmission timer is running, for example) for the HARQ process and does not stop the G-RNTI retransmission timer (e.g., the UE keeps the G-RNTI retransmission timer for the same HARQ process running). For example, the UE may stop the C-RNTI retransmission timer and may keep the G-RNTI retransmission timer running in response to receiving/detecting the transmission of the data if the transmission of the data is a retransmission of the data and is addressed to C-RNTI for the HARQ process.

In some examples, if the UE receives/detects an initial transmission (e.g., a new transmission) addressed to C-RNTI or G-RNTI for the HARQ process, the UE stops both G-RNTI retransmission timer (if running, for example) and C-RNTI retransmission timer for the HARQ process. In an example, if UE receives/detects a retransmission addressed to G-RNTI for the HARQ process, the UE stops G-RNTI retransmission timer (if running, for example) for the HARQ process and keeps C-RNTI retransmission timer for the same HARQ process running (e.g., the UE does not stop the C-RNTI retransmission timer if the C-RNTI retransmission timer is running). In an example, if UE receives/detects a retransmission addressed to C-RNTI for the HARQ process, the UE stops C-RNTI retransmission timer (if running, for example) for the HARQ process and keeps G-RNTI retransmission timer for the same HARQ process running (e.g., the UE does not stop the G-RNTI retransmission timer if the G-RNTI retransmission timer is running).

In some examples, if a UE receives/detects a transmission (e.g., retransmission) of data addressed to G-RNTI for a HARQ process and the data (e.g., the data carried by the transmission) has been decoded successfully before reception of the transmission (e.g., the retransmission), the UE may not transmit ACK for the data (e.g., the UE may not transmit an ACK in response to the transmission, such as the retransmission, of the data). In some examples, the UE previously sent ACK for an earlier transmission of the same data addressed to C-RNTI or G-RNTI for the same HARQ process.

In an example scenario, the UE receives/detects a first transmission of data addressed to C-RNTI or G-RNTI for a HARQ process. The UE transmits ACK for the first transmission of the data based on successfully decoding the data (e.g., the data that is carried by the first transmission of the data). For example, the ACK may indicate that the UE successfully decoded the data using the first transmission of the data. If the UE receives/detects a second transmission of the data (e.g., a retransmission of the data) addressed to G-RNTI for the HARQ process, the UE may not transmit ACK for the second transmission of the data (e.g., the UE may not transmit ACK for the second transmission of the data based on the data already having been decoded successfully by the UE using the first transmission of the data).

In some examples, if a UE receives/detects a transmission (e.g., retransmission) of data addressed to C-RNTI for a HARQ process and the data (e.g., the data carried by the transmission) has been decoded successfully before reception of the transmission (e.g., the retransmission), the UE may transmit ACK for the data (e.g., the UE may transmit an ACK in response to the transmission, such as the retransmission, of the data). For example, the UE may transmit the ACK for the data in response to successfully decoding the data using the transmission (e.g., the retransmission) of the data. Embodiments are contemplated in which the UE does not transmit ACK for the data in response to the transmission (e.g., the retransmission) of the data (such as where the UE does not transmit ACK in response to successfully decoding the data using the transmission, such as the retransmission, of the data). In some examples, the UE previously sent ACK for an earlier transmission of the same data addressed to C-RNTI or G-RNTI for the same HARQ process.

In an example scenario, the UE receives/detects a first transmission of data addressed to C-RNTI or G-RNTI for a HARQ process. The UE transmits ACK for the first transmission of the data based on successfully decoding the data (e.g., the data that is carried by the first transmission of the data). For example, the ACK may indicate that the UE successfully decoded the data using the first transmission of the data. If the UE receives/detects a second transmission of the data (e.g., a retransmission of the data) addressed to C-RNTI for the HARQ process, the UE may transmit ACK for the second transmission of the data (e.g., the UE may transmit ACK based on successfully decoding the data using the second transmission of the data). Embodiments are contemplated in which the UE does not transmit ACK for the second transmission of the data (such as where the UE does not transmit ACK in response to successfully decoding the data using the transmission).

In some examples, if a UE receives/detects a transmission (e.g., retransmission) of data addressed to G-RNTI for a HARQ process, the UE may stop the G-RNTI retransmission timer. For example, the UE may stop the G-RNTI retransmission timer in response to receiving/detecting the transmission (e.g., the retransmission) of the data addressed to the G-RNTI for the HARQ process. If the data (e.g., the data carried by the transmission) is decoded successfully, the UE may stop a C-RNTI retransmission timer (e.g., C-RNTI retransmission timer associated with the HARQ process) and/or a C-RNTI HARQ RTT timer (e.g., C-RNTI HARQ RTT timer associated with the HARQ process). For example, the UE may stop the C-RNTI retransmission timer and/or the C-RNTI HARQ RTT timer in response to receiving/detecting the transmission (e.g., the retransmission) of the data addressed to the G-RNTI for the HARQ process. In some examples, the UE may transmit ACK for the data. For example, the UE may transmit the ACK in response to receiving/detecting the transmission (e.g., the retransmission) of the data addressed to the G-RNTI for the HARQ process and/or in response to successfully decoding the data (e.g., the data carried by the transmission of the data).

In some examples, if a UE receives/detects a transmission (e.g., retransmission) of data for addressed to G-RNTI for a HARQ process and the data (e.g., the data carried by the transmission) is not decoded successfully, the UE may or may not send NACK for the data (e.g., the UE may or may not send NACK in response to the transmission, such as the retransmission, of the data). In some examples, in a scenario in which the UE transmits NACK for the data (e.g., the UE transmits the NACK in response to the transmission, such as the retransmission, of the data), the UE may not start a corresponding HARQ RTT timer for the G-RNTI in response to (e.g., upon) the transmission of the NACK. In some examples, in a scenario in which the UE transmits NACK for the data (e.g., the UE transmits the NACK in response to the transmission, such as the retransmission, of the data), the UE starts the corresponding HARQ RTT timer for the G-RNTI in response to (e.g., upon) the transmission of the NACK but may not start a retransmission timer for the G-RNTI (e.g., G-RNTI retransmission timer). In some examples, a C-RNTI retransmission timer (e.g., drx-RetransmissionTimerDL) is running (e.g., the C-RNTI retransmission timer is running when and/or after the UE receives/detects the transmission of the data addressed to the G-RNTI and/or the UE transmits the NACK). Considering that the C-RNTI retransmission timer is still running (e.g., the C-RNTI retransmission timer is still running when and/or after the UE receives/detects the transmission of the data addressed to the G-RNTI and/or the UE transmits the NACK), the network (e.g., gNB) may schedule a unicast retransmission (e.g., a specific unicast retransmission) for the data so the corresponding HARQ RTT timer for the G-RNTI or the retransmission timer for the G-RNTI do not need to start additionally for potential retransmission scheduling through multicast (e.g., since the C-RNTI retransmission timer is still running, the network is able to schedule a unicast retransmission of the data for the UE to deliver the data to the UE, and it is not necessary for the network to perform a multicast retransmission of the data to deliver the data to the UE).

In some examples, a RNTI, such as a G-RNTI, a C-RNTI, etc., associated with a UE may be used to identify the UE in communications with the UE. In an example in which the RNTI is a C-RNTI, a transmission (e.g., a unicast transmission) may be addressed to the RNTI (e.g., C-RNTI) of the UE if the UE is the intended recipient of the transmission. In an example in which the RNTI is a G-RNTI, a transmission (e.g., a multicast transmission) may be addressed to the RNTI (e.g., G-RNTI) associated with a plurality of UEs (e.g., a group of UEs) comprising the UE if the plurality of UEs, comprising the UE, are intended recipients of the transmission.

The UE may receive/detect a first transmission (and/or control channel, such as PDCCH, comprising the first transmission) using the RNTI. The first transmission that is addressed to the RNTI may comprise an indication of the RNTI. In some examples, in response to receiving/detecting the first transmission (and/or the control channel) addressed to the RNTI, the UE may attempt to receive/detect one or more second transmissions on a data channel (e.g., PDSCH) using information carried by the first transmission. The information carried by the first transmission may comprise information indicative of (i) HARQ process information associated with the one or more second transmissions, (ii) whether a transmission of the one or more second transmissions is a new transmission or a retransmission, and/or (iii) other information associated with the one or more second transmissions and/or the data channel. The HARQ process information carried by the first transmission may identify a HARQ process (e.g., the HARQ process information may comprise a HARQ process ID of the HARQ process). In some examples, the UE receives/detects the one or more second transmissions and/or communicates (e.g., performs monitoring, reception/detection and/or transmission) on the data channel in accordance with the HARQ process.

One, some and/or all of the foregoing examples, concepts, techniques and/or embodiments can be formed and/or combined to a new embodiment.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 9:
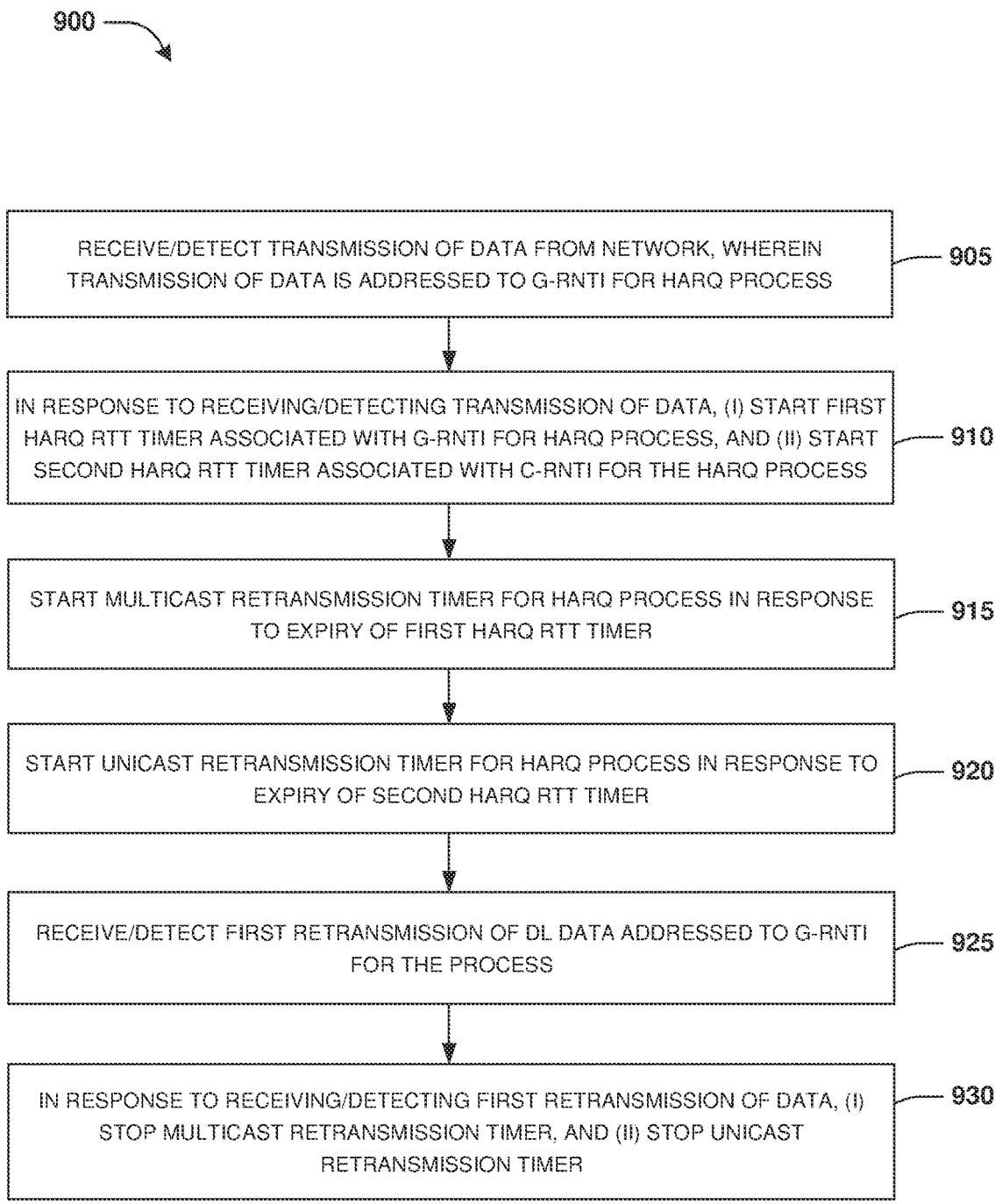
FIG. 9 is a flow chart according to one exemplary embodiment.

FIG. 9 is a flow chart 900 according to one exemplary embodiment from the perspective of a UE. In step 905, the UE receives/detects a transmission of data (e.g., downlink data) from a network, wherein the transmission of the data is addressed to a G-RNTI for a HARQ process. In an example, the transmission of the data is associated with (e.g., performed using and/or performed as part of) the HARQ process. In step 910, in response to receiving/detecting the transmission of the data, the UE (i) starts a first HARQ RTT timer associated with the G-RNTI for the HARQ process, and (ii) starts a second HARQ RTT timer associated with a C-RNTI for the HARQ process. In an example, the UE concurrently (e.g., simultaneously) starts the first HARQ RTT timer and the second HARQ RTT timer. In an example, the first HARQ RTT timer and/or the second HARQ RTT timer are associated with (e.g., used by) the HARQ process. In step 915, the UE starts a multicast retransmission timer for the HARQ process in response to (e.g., upon) expiry of the first HARQ RTT timer. In an example, the multicast retransmission timer is associated with (e.g., used by) the HARQ process. In step 920, the UE starts a unicast retransmission timer for the HARQ process in response to (e.g., upon) expiry of the second HARQ RTT timer. In an example, the unicast retransmission timer is associated with (e.g., used by) the HARQ process. In step 925, the UE receives/detects a first retransmission of the data addressed to the G-RNTI for the HARQ process. In an example, the first retransmission of the data is associated with (e.g., performed using and/or performed as part of) the HARQ process. In an example, the first retransmission of the data is a multicast transmission from the network. In step 930, in response to receiving/detecting the first retransmission of the data, the UE (i) stops the multicast retransmission timer, and (ii) stops the unicast retransmission timer. In an example, the UE concurrently (e.g., simultaneously) stops the multicast retransmission timer and the unicast retransmission timer.

In one embodiment, the first HARQ RTT timer (associated with the G-RNTI) is the same as the second HARQ RTT timer (associated with the C-RNTI).

In one embodiment, the first HARQ RTT timer (associated with the G-RNTI) is different than the second HARQ RTT timer (associated with the C-RNTI).

In one embodiment, the UE starts the first HARQ RTT timer (associated with the G-RNTI) and the second HARQ RTT timer (associated with the C-RNTI) in response to transmission of NACK information. In an example, the UE transmits the NACK information (to the network, for example) in response to receiving/detecting the transmission of the data (e.g., the NACK information may indicate that the UE did not successfully decode the data carried by the transmission of the data). In an example, the UE transmits the NACK information based on the UE not having successfully decoded the data carried by the transmission of the data.

In one embodiment, the UE receives/detects a second retransmission of the data addressed to the C-RNTI for the HARQ process. In an example, the second retransmission of the data is associated with (e.g., performed using and/or performed as part of) the HARQ process. In an example, the second retransmission of the data is a unicast transmission from the network. In response to receiving/detecting the second retransmission of the data, the UE (i) stops the multicast retransmission timer, and (ii) stops the unicast retransmission timer.

In one embodiment, the UE does not start the multicast retransmission timer in response to receiving/detecting the second retransmission of the data.

In one embodiment, the UE monitors PDCCH when the multicast retransmission timer is running and/or the unicast retransmission timer is running.

In one embodiment, the G-RNTI is used by the UE for receiving services (e.g., different services) from the network.

In one embodiment, the G-RNTI is associated with a group of UEs, comprising the UE, that receive services (e.g., different services) from the network. In an example, the group of UEs use the G-RNTI to receive services (e.g., different services) from the network.

In one embodiment, the UE transmits, to the network, NACK information for the HARQ process if the data is not successfully decoded. For example, in response to receiving/detecting the transmission of the data, the UE may transmit NACK information (e.g., the NACK information may indicate that the UE did not successfully decode the data transmitted via the transmission) if the UE does not successfully decode the data transmitted via the transmission. Alternatively and/or additionally, in response to receiving/detecting the first retransmission of the data, the UE may transmit NACK information (e.g., the NACK information may indicate that the UE did not successfully decode the data transmitted via the first retransmission) if the UE does not successfully decode the data transmitted via the first retransmission. Alternatively and/or additionally, in response to receiving/detecting the second retransmission of the data, the UE may transmit NACK information (e.g., the NACK information may indicate that the UE did not successfully decode the data transmitted via the second retransmission) if the UE does not successfully decode the data transmitted via the first retransmission.

In one embodiment, the network comprises a gNB.

In one embodiment, the data comprises a TB and/or a MAC PDU.

Referring back to FIGS. 3 and 4, in one exemplary embodiment of a UE, the device 300 includes a program code 312 stored in the memory 310. The CPU 308 could execute program code 312 to enable the UE (i) to receive/detect a transmission of data (e.g., downlink data) from a network, wherein the transmission of the data is addressed to a G-RNTI for a HARQ process, (ii) in response to receiving/detecting the transmission of the data, to (A) start a first HARQ RTT timer associated with the G-RNTI for the HARQ process, and (B) start a second HARQ RTT timer associated with a C-RNTI for the HARQ process, (iii) to start a multicast retransmission timer for the HARQ process in response to (e.g., upon) expiry of the first HARQ RTT timer, (iv) to start a unicast retransmission timer for the HARQ process in response to (e.g., upon) expiry of the second HARQ RTT timer, (v) to receive/detect a first retransmission of the DL data addressed to the G-RNTI for the HARQ process, and (vi) in response to receiving/detecting the first retransmission of the data, to (A) stop the multicast retransmission timer, and (B) stop the unicast retransmission timer. Furthermore, the CPU 308 can execute the program code 312 to perform one, some and/or all of the above-described actions and steps and/or others described herein.

Figure 10:
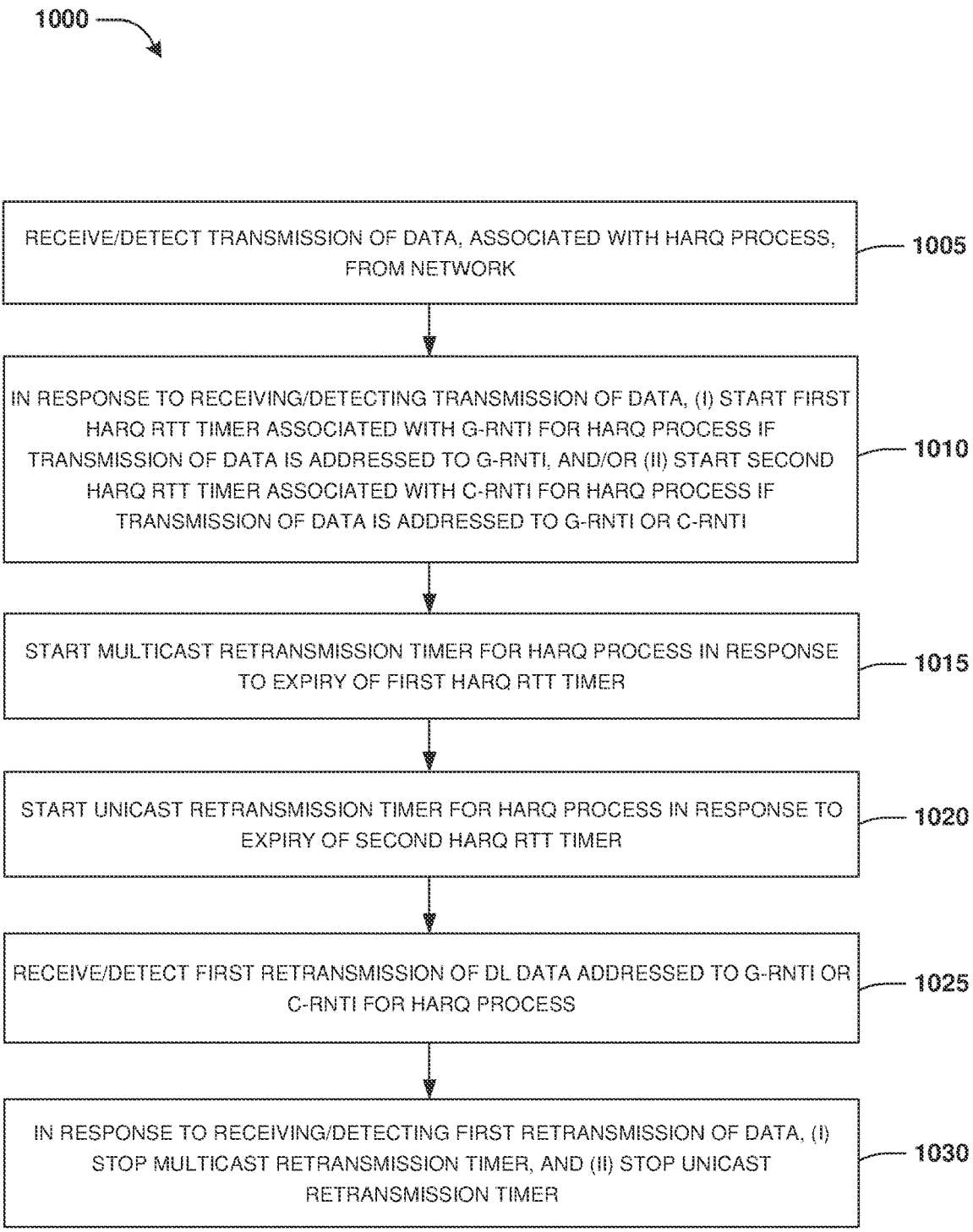
FIG. 10 is a flow chart according to one exemplary embodiment.

FIG. 10 is a flow chart 1000 according to one exemplary embodiment from the perspective of a UE. In step 1005, the UE receives/detects a transmission of data (e.g., downlink data), associated with a HARQ process, from a network. In an example, the transmission of the data is associated with (e.g., performed using and/or performed as part of) the HARQ process. In step 1010, in response to receiving/detecting the transmission of the data, the UE (i) starts a first HARQ RTT timer associated with a G-RNTI for the HARQ process if the transmission of the data is addressed to the G-RNTI, and/or (ii) starts a second HARQ RTT timer associated with a C-RNTI for the HARQ process if the transmission of the data is addressed to the G-RNTI or the C-RNTI. For example, if the transmission of the data is addressed to the G-RNTI, the UE starts the first HARQ RTT timer and the second HARQ RTT timer in response to receiving/detecting the transmission of the data (e.g., the UE may concurrently, such as simultaneously, start the first HARQ RTT timer and the second HARQ RTT timer). If the transmission of the data is addressed to the C-RNTI, the UE starts the second HARQ RTT timer (and does not start the first HARQ RTT timer, for example) in response to receiving/detecting the transmission of the data. In an example, the first HARQ RTT timer and/or the second HARQ RTT timer are associated with (e.g., used by) the HARQ process. In step 1015, the UE starts a multicast retransmission timer for the HARQ process in response to (e.g., upon) expiry of the first HARQ RTT timer. In an example, the multicast retransmission timer is associated with (e.g., used by) the HARQ process. In step 1020, the UE starts a unicast retransmission timer for the HARQ process in response to (e.g., upon) expiry of the second HARQ RTT timer. In an example, the unicast retransmission timer is associated with (e.g., used by) the HARQ process. In step 1025, the UE receives/detects a first retransmission of the data addressed to the G-RNTI or the C-RNTI for the HARQ process. In an example, the first retransmission of the data is associated with (e.g., performed using and/or performed as part of) the HARQ process. In an example, the first retransmission of the data is from the network. In step 1030, in response to receiving/detecting the first retransmission of the data, the UE (i) stops the multicast retransmission timer, and (ii) stops the unicast retransmission timer.

In one embodiment, the first HARQ RTT timer (associated with the G-RNTI) is the same as the second HARQ RTT timer (associated with the C-RNTI).

In one embodiment, the first HARQ RTT timer (associated with the G-RNTI) is different than the second HARQ RTT timer (associated with the C-RNTI).

In one embodiment, the UE starts the first HARQ RTT timer (associated with the G-RNTI) and the second HARQ RTT timer (associated with the C-RNTI) in response to transmission of NACK information. In an example, the UE transmits the NACK information (to the network, for example) in response to receiving/detecting the transmission of the data (e.g., the NACK information may indicate that the UE did not successfully decode the data carried by the transmission of the data). In an example, the UE transmits the NACK information based on the UE not having successfully decoded the data carried by the transmission of the data.

In one embodiment, the UE monitors PDCCH when the multicast retransmission timer is running and/or the unicast retransmission timer is running.

In one embodiment, the G-RNTI is used by the UE for receiving services (e.g., different services) from the network.

In one embodiment, the G-RNTI is associated with a group of UEs, comprising the UE, that receive services (e.g., different services) from the network. In an example, the group of UEs use the G-RNTI to receive services (e.g., different services) from the network.

In one embodiment, the UE transmits, to the network, NACK information for the HARQ process if the data is not successfully decoded. For example, in response to receiving/detecting the transmission of the data, the UE may transmit NACK information (e.g., the NACK information may indicate that the UE did not successfully decode the data transmitted via the transmission) if the UE does not successfully decode the data transmitted via the transmission. Alternatively and/or additionally, in response to receiving/detecting the first retransmission of the data, the UE may transmit NACK information (e.g., the NACK information may indicate that the UE did not successfully decode the data transmitted via the first retransmission) if the UE does not successfully decode the data transmitted via the first retransmission.

In one embodiment, the network comprises a gNB.

In one embodiment, the data comprises a TB and/or a MAC PDU.

Referring back to FIGS. 3 and 4, in one exemplary embodiment of a UE, the device 300 includes a program code 312 stored in the memory 310. The CPU 308 could execute program code 312 to enable the UE (i) to receive/detect a transmission of data (e.g., downlink data), associated with a HARQ process, from a network, (ii) in response to receiving/detecting the transmission of the data, to (A) start a first HARQ RTT timer associated with a G-RNTI for the HARQ process if the transmission of the data is addressed to the G-RNTI, and/or (B) start a second HARQ RTT timer associated with a C-RNTI for the HARQ process if the transmission of the data is addressed to the G-RNTI or the C-RNTI, (iii) to start a multicast retransmission timer for the HARQ process in response to (e.g., upon) expiry of the first HARQ RTT timer, (iv) to start a unicast retransmission timer for the HARQ process in response to (e.g., upon) expiry of the second HARQ RTT timer, (v) to receive/detect a first retransmission of the DL data addressed to the G-RNTI or the C-RNTI for the HARQ process, and (vi) in response to receiving/detecting the first retransmission of the data, to (A) stop the multicast retransmission timer, and (B) stop the unicast retransmission timer. Furthermore, the CPU 308 can execute the program code 312 to perform one, some and/or all of the above-described actions and steps and/or others described herein.

Figure 11:
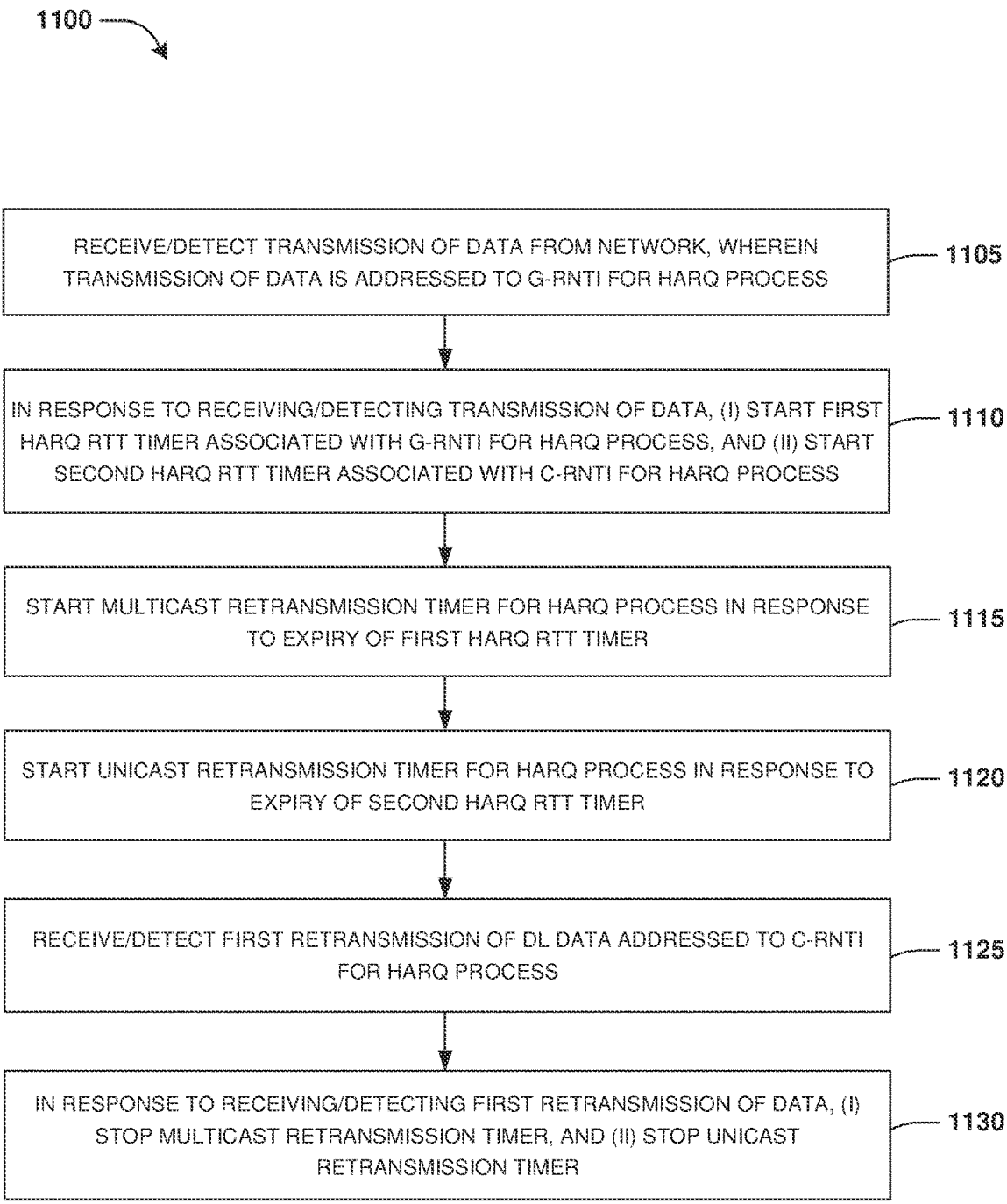
FIG. 11 is a flow chart according to one exemplary embodiment.

FIG. 11 is a flow chart 1100 according to one exemplary embodiment from the perspective of a UE. In step 1105, the UE receives/detects a transmission of data (e.g., downlink data) from a network, wherein the transmission of the data is addressed to a G-RNTI for a HARQ process. In an example, the transmission of the data is associated with (e.g., performed using and/or performed as part of) the HARQ process. In step 1110, in response to receiving/detecting the transmission of the data, the UE (i) starts a first HARQ RTT timer associated with the G-RNTI for the HARQ process, and (ii) starts a second HARQ RTT timer associated with a C-RNTI for the HARQ process. In an example, the UE concurrently (e.g., simultaneously) starts the first HARQ RTT timer and the second HARQ RTT timer. In an example, the first HARQ RTT timer and/or the second HARQ RTT timer are associated with (e.g., used by) the HARQ process. In step 1115, the UE starts a multicast retransmission timer for the HARQ process in response to (e.g., upon) expiry of the first HARQ RTT timer. In an example, the multicast retransmission timer is associated with (e.g., used by) the HARQ process. In step 1120, the UE starts a unicast retransmission timer for the HARQ process in response to (e.g., upon) expiry of the second HARQ RTT timer. In an example, the unicast retransmission timer is associated with (e.g., used by) the HARQ process. In step 1125, the UE receives/detects a first retransmission of the data addressed to the C-RNTI for the HARQ process. In an example, the first retransmission of the data is associated with (e.g., performed using and/or performed as part of) the HARQ process. In an example, the first retransmission of the data is a unicast transmission from the network. In step 1130, in response to receiving/detecting the first retransmission of the data, the UE (i) stops the multicast retransmission timer, and (ii) stops the unicast retransmission timer. In an example, the UE concurrently (e.g., simultaneously) stops the multicast retransmission timer and the unicast retransmission timer.

In one embodiment, the first HARQ RTT timer (associated with the G-RNTI) is the same as the second HARQ RTT timer (associated with the C-RNTI).

In one embodiment, the first HARQ RTT timer (associated with the G-RNTI) is different than the second HARQ RTT timer (associated with the C-RNTI).

In one embodiment, the UE starts the first HARQ RTT timer (associated with the G-RNTI) and the second HARQ RTT timer (associated with the C-RNTI) in response to transmission of NACK information. In an example, the UE transmits the NACK information (to the network, for example) in response to receiving/detecting the transmission of the data (e.g., the NACK information may indicate that the UE did not successfully decode the data carried by the transmission of the data). In an example, the UE transmits the NACK information based on the UE not having successfully decoded the data carried by the transmission of the data.

In one embodiment, the UE does not start the multicast retransmission timer in response to receiving/detecting the first retransmission of the data.

In one embodiment, the UE monitors PDCCH when the multicast retransmission timer is running and/or the unicast retransmission timer is running.

In one embodiment, the G-RNTI is used by the UE for receiving services (e.g., different services) from the network.

In one embodiment, the G-RNTI is associated with a group of UEs, comprising the UE, that receive services (e.g., different services) from the network. In an example, the group of UEs use the G-RNTI to receive services (e.g., different services) from the network.

In one embodiment, the UE transmits, to the network, NACK information for the HARQ process if the data is not successfully decoded. For example, in response to receiving/detecting the transmission of the data, the UE may transmit NACK information (e.g., the NACK information may indicate that the UE did not successfully decode the data transmitted via the transmission) if the UE does not successfully decode the data transmitted via the transmission. Alternatively and/or additionally, in response to receiving/detecting the first retransmission of the data, the UE may transmit NACK information (e.g., the NACK information may indicate that the UE did not successfully decode the data transmitted via the first retransmission) if the UE does not successfully decode the data transmitted via the first retransmission.

In one embodiment, the network comprises a gNB.

In one embodiment, the data comprises a TB and/or a MAC PDU.

Referring back to FIGS. 3 and 4, in one exemplary embodiment of a UE, the device 300 includes a program code 312 stored in the memory 310. The CPU 308 could execute program code 312 to enable the UE (i) to receive/detect a transmission of data (e.g., downlink data) from a network, wherein the transmission of the data is addressed to a G-RNTI for a HARQ process, (ii) in response to receiving/detecting the transmission of the data, to (A) start a first HARQ RTT timer associated with the G-RNTI for the HARQ process, and (B) start a second HARQ RTT timer associated with a C-RNTI for the HARQ process, (iii) to start a multicast retransmission timer for the HARQ process in response to (e.g., upon) expiry of the first HARQ RTT timer, (iv) to start a unicast retransmission timer for the HARQ process in response to (e.g., upon) expiry of the second HARQ RTT timer, (v) to receive/detect a first retransmission of the DL data addressed to the C-RNTI for the HARQ process, and (vi) in response to receiving/detecting the first retransmission of the data, to (A) stop the multicast retransmission timer, and (B) stop the unicast retransmission timer. Furthermore, the CPU 308 can execute the program code 312 to perform one, some and/or all of the above-described actions and steps and/or others described herein.

A communication device (e.g., a UE, a network such as a gNB and/or a base station, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 9-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 9-11, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network, such as a gNB), such as due, at least in part, to reducing active time for G-RNTI monitoring (and/or reducing the amount of time the UE spends performing G-RNTI monitoring, such as monitoring for multicast retransmissions). For example, in some systems, the UE may monitor for and/or receive multicast retransmissions of data even when the network has decided to schedule unicast retransmissions for the data (thereby wasting power of the UE, for example). However, using one or more of the techniques herein, the UE may be enabled to receive a unicast retransmission of data without having to monitor for multicast retransmissions of the same data, thereby providing for reduction of power consumption of the UE.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
   at least one of receiving or detecting a transmission of data from a network, wherein the transmission of the data is addressed to a Group Radio Network Temporary Identifier (G-RNTI) for a Hybrid Automatic Repeat Request (HARQ) process;
   in response to at least one of receiving or detecting the transmission of the data:
      starting a first HARQ Round Trip Time (RTT) timer associated with the G-RNTI for the same HARQ process; and
      starting a second HARQ RTT timer associated with a Cell Radio Network Temporary Identifier (C-RNTI) for the same HARQ process;
   in response to expiry of the first HARQ RTT timer, starting a multicast retransmission timer for the same HARQ process;
   in response to expiry of the second HARQ RTT timer, starting a unicast retransmission timer for the same HARQ process;
   at least one of receiving or detecting a first retransmission of the data addressed to the G-RNTI for the same HARQ process; and
   in response to at least one of receiving or detecting the first retransmission of the data for the same HARQ process:
      stopping the multicast retransmission timer; and
      stopping the unicast retransmission timer.

2. The method of claim 1, comprising:
   at least one of receiving or detecting a second retransmission of the data addressed to the C-RNTI for the same HARQ process; and
   in response to at least one of receiving or detecting the second retransmission of the data:
      stopping the multicast retransmission timer; and
      stopping the unicast retransmission timer.

3. The method of claim 2, comprising:
   not starting the multicast retransmission timer in response to at least one of receiving or detecting the second retransmission of the data.

4. The method of claim 1, comprising:
   monitoring Physical Downlink Control Channel (PDCCH) when at least one of the multicast retransmission timer is running or the unicast retransmission timer is running.

5. The method of claim 1, wherein:
   the G-RNTI is used by the UE for receiving services from the network.

6. The method of claim 5, wherein:
   the G-RNTI is associated with a group of UEs, comprising the UE, that receive services from the network.

7. The method of claim 1, comprising:
   transmitting, to the network, Negative Acknowledgment (NACK) information for the same HARQ process if the data is not successfully decoded.

8. The method of claim 1, wherein:
   the network comprises a Next Generation NodeB (gNB).

9. The method of claim 1, wherein:
   the data comprises at least one of a transport block (TB) or a Medium Access Control Protocol Data Unit (MAC PDU).

10. A method of a User Equipment (UE), the method comprising:
   at least one of receiving or detecting a transmission of data, associated with a Hybrid Automatic Repeat Request (HARQ) process, from a network;
   in response to at least one of receiving or detecting the transmission of the data, at least one of:
      starting a first HARQ Round Trip Time (RTT) timer associated with a Group Radio Network Temporary Identifier (G-RNTI) for the same HARQ process if the transmission of the data is addressed to the G-RNTI; or
      starting a second HARQ RTT timer associated with a Cell Radio Network Temporary Identifier (C-RNTI) for the same HARQ process if the transmission of the data is addressed to the G-RNTI or the C-RNTI;
   in response to expiry of the first HARQ RTT timer, starting a multicast retransmission timer for the same HARQ process;
   in response to expiry of the second HARQ RTT timer, starting a unicast retransmission timer for the same HARQ process;
   at least one of receiving or detecting a first retransmission of the data addressed to the G-RNTI or the C-RNTI for the same HARQ process; and
   in response to at least one of receiving or detecting the first retransmission of the data for the same HARQ process:
      stopping the multicast retransmission timer; and
      stopping the unicast retransmission timer.

11. The method of claim 10, comprising:
   monitoring Physical Downlink Control Channel (PDCCH) when at least one of the multicast retransmission timer is running or the unicast retransmission timer is running.

12. The method of claim 10, wherein:
   the G-RNTI is used by the UE for receiving services from the network.

13. The method of claim 12, wherein:
   the G-RNTI is associated with a group of UEs, comprising the UE, that receive services from the network.

14. The method of claim 10, comprising:
   transmitting, to the network, Negative Acknowledgment (NACK) information for the same HARQ process if the data is not successfully decoded.

15. The method of claim 10, wherein:

the network comprises a Next Generation NodeB (gNB).

16. The method of claim 10, wherein:

the data comprises at least one of a transport block (TB) or a Medium Access Control Protocol Data Unit (MAC PDU).

17. A User Equipment (UE), comprising:

a control circuit;

a processor installed in the control circuit; and a memory installed in the control circuit and operatively coupled to the processor, wherein the processor is configured to execute a program code stored in the memory to perform operations, the operations comprising:

at least one of receiving or detecting a transmission of data from a network, wherein the transmission of the data is addressed to a Group Radio Network Temporary Identifier (G-RNTI) for a Hybrid Automatic Repeat Request (HARQ) process;

in response to at least one of receiving or detecting the transmission of the data:

starting a first HARQ Round Trip Time (RTT) timer associated with the G-RNTI for the same HARQ process; and starting a second HARQ RTT timer associated with a Cell Radio Network Temporary Identifier (C-RNTI) for the same HARQ process;

in response to expiry of the first HARQ RTT timer, starting a multicast retransmission timer for the same HARQ process;

in response to expiry of the second HARQ RTT timer, starting a unicast retransmission timer for the same HARQ process;

at least one of receiving or detecting a first retransmission of the data addressed to the C-RNTI for the same HARQ process; and in response to at least one of receiving or detecting the first retransmission of the data for the same HARQ process:

stopping the multicast retransmission timer; and stopping the unicast retransmission timer.

18. The UE of claim 17, the operations comprising:

not starting the multicast retransmission timer in response to at least one of receiving or detecting the first retransmission of the data.

19. The UE of claim 17, the operations comprising:

monitoring Physical Downlink Control Channel (PDCCH) when at least one of the multicast retransmission timer is running or the unicast retransmission timer is running.

20. The UE of claim 17, wherein:

the G-RNTI is used by the UE for receiving services from the network; and the G-RNTI is associated with a group of UEs, comprising the UE, that receive services from the network.

\* \* \* \* \*